United States Patent
Abe et al.

(10) Patent No.: US 6,230,552 B1
(45) Date of Patent: May 15, 2001

(54) SURFACE TREATMENT SHAPE EVALUATION SYSTEM AND SURFACE TREATMENT SHAPE

(75) Inventors: Yoichi Abe; Shoichi Kameta, both of Chiba; Ryoichi Sato, Hiroshima, all of (JP)

(73) Assignee: New Tokyo International Airport Authority, Chiba (JP)

( * ) Notice: Subject to any disclaimer, the term of this patent is extended or adjusted under 35 U.S.C. 154(b) by 0 days.

(21) Appl. No.: 09/463,182

(22) PCT Filed: May 25, 1999

(86) PCT No.: PCT/JP99/02736

§ 371 Date: Jan. 20, 2000

§ 102(e) Date: Jan. 20, 2000

(87) PCT Pub. No.: WO99/61706

PCT Pub. Date: Dec. 2, 1999

(30) Foreign Application Priority Data

May 28, 1998 (JP) .................................... 10-164138

(51) Int. Cl.⁷ .......................... B23Q 17/09; G01B 05/28; E01C 23/01
(52) U.S. Cl. ............................................... 73/104; 73/105
(58) Field of Search .......................... 73/104, 105, 620; 702/166, 167; 250/559.19, 559.24; 405/75, 91

(56) References Cited

U.S. PATENT DOCUMENTS

| 4,571,695 | * | 2/1986 | Elton et al. ........................ 702/167 |
| 5,280,719 | * | 1/1994 | Noss ................................... 73/146 |

FOREIGN PATENT DOCUMENTS

| 9-71902 | 3/1997 | (JP) . |
| 10-114909 | 5/1998 | (JP) . |

\* cited by examiner

*Primary Examiner*—Daniel S. Larkin
*Assistant Examiner*—Katina M Wilson
(74) *Attorney, Agent, or Firm*—Rosenthal & Osha L.L.P.

(57) ABSTRACT

When the unevenness quantities of the surface of a surface-treated, existing concrete are measured at a given pitch by a measuring device 10, the measured unevenness quantities are automatically collected by a CPU 21 to calculate the characteristic quantities of the surface-treated form of the existing concrete. The CPU 21 compares the calculated characteristic quantities with characteristic quantities beforehand stored in a data ROM 23 to give an evaluated result of the surface-treated form automatically. The evaluated result is displayed on a display device 40 or printed by a printer 50, so that the result can be immediately checked. An ideal surface-treated form is a surface-treated form in which the average height of unevenness of the surface of the existing concrete is from 13 to 35% of the maximum particle size of aggregates contained in the existing concrete, and the slope length ratio thereof is 1.13 or more, and the unevenness having a height of 2 mm or more occupies 14% or more of all the unevenness.

20 Claims, 19 Drawing Sheets

FIG. 2
(a) 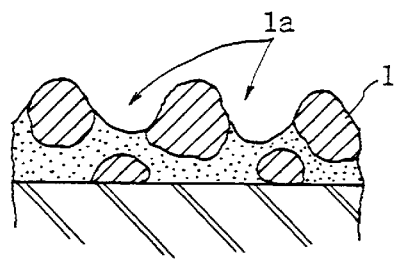
(b) 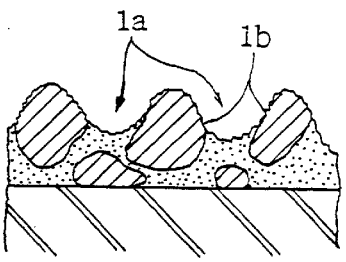
(c) 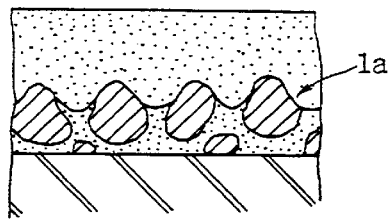
FIG. 3
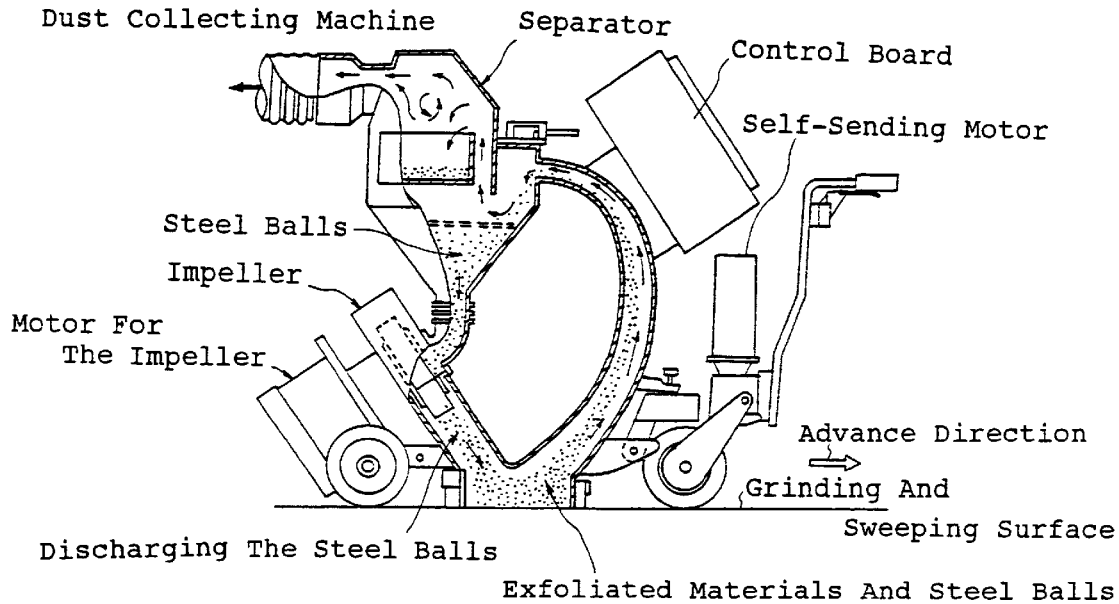

Surface-Treated Form Which Is Measured

Average 1.14 mm
Standard Deviation 2.28
Average Slope Length 555.72 mm
Average Unevenness Length 10.35 mm

SURFACE TREATMENT SHAPE EVALUATION SYSTEM AND SURFACE TREATMENT SHAPE

FIELD OF THE INVENTION

The present invention relates to surface-treatment technique for an existing concrete in an adhesion type overlay method adopted in the repair work of a concrete pavement, and in particular to a surface-treated form evaluating system and an ideal surface-treated form.

BACKGROUND ART

In the repair work of a runway, a road or the like which is paved with concrete, there has been adopted an adhesion type overlay method, in which the surface of an existing concrete is overlaid with a new concrete. In the adhesion type overlay method, it is desirable that the new concrete is jointed to the existing concrete with sufficient jointing strength.

Thus, in order to improve adhesive properties of a construction-jointed portion, an existing concrete has hitherto been subjected to pretreatment for cutting the surface thereof before the overlay with a new concrete. The pretreatment is performed to remove an old surface layer and obtain an anchor effect, which is based on unevenness formed at the surface after the removal of the surface layer, on the new concrete.

The cutting method may be, for example, a method of using a vibration chipper to chip out the surface of a concrete.

However, the following technical problems remain in the cutting method in the prior art.

The pretreatment using a chipper involves many works depending on human hands. Therefore, the execution efficiency on a wide working spot is low. Moreover, workers are greatly effected by the generation of fine particles and vibration. Additionally, it takes long time to remove chipped concrete chips.

In order to improve adhesive properties of such a construction-jointed portion, for example, Japanese Patent Application Laid-Open No. 9-71902 discloses an overlay method of jetting highly-pressured water on a surface layer of an existing concrete for a pavement by water jet to form a macro-unevenness surface, jetting a large number of small and hard balls, in spherical or other forms, composed of a metal such as iron onto the macro-unevenness surface by shot blast to form numerous micro-unevenness having such an appropriate size that sufficient adhesion strength can be obtained, and overlaying the uneven surface which has the macro-unevenness and the micro-unevenness with a concrete material for a pavement, which has a given thickness, to form a surface layer on the uneven surface. According to this overlay method, the uneven surface can be easily and promptly formed without making pavement strength weak by the combination of water jet with shot blast. Therefore, the whole of the period of construction can be shortened, and further the adhesion strength of the paved surface for overlay can be improved still more than that in the case of using a chipper.

Even if the surface of an existing concrete is subjected to the surface treatment for forming unevenness by using both of water jet and shot blast, as disclosed in the above-mentioned publication, the adhesion strength of the newly formed concrete to the surface layer of the existing concrete varies according to the surface form generated based on the degree of the treatment.

Thus, in order to obtain sufficient adhesion strength, it is desirable to overlay, on trial, existing concretes having surface forms which are little by little different with a new concrete, measure the adhesion strength of the respective resultants by a tensile test or the like to specify an ideal surface form, and evaluate whether or not such an ideal surface form is formed on an actual pavement construction spot on the basis of the above-mentioned results.

However, in order to evaluate the surface-treated forms, it is necessary to measure the quantity of the unevenness at the surfaces of the existing concretes after the surface-treatment in their many points at the pavement construction spot, calculate characteristic quantities such as an average value of the unevenness quantities and a standard deviation thereof from the collected results, and compare the characteristic quantities with the characteristic quantities of the above-mentioned ideal surface-treated form. It takes a long time to carry out such measurement, collection of data, calculation and comparison on the spot and perform an exact evaluation. Thus, the shortening of the period of the construction may be hindered.

Thus, an object of the present invention is to provide a surface-treated form evaluating system making it possible to evaluate a surface-treated form of an existing concrete accurately for a short time in an adhesion type overlay method of surface-treating the existing concrete and then overlaying the treated concrete with a new concrete; and an ideal surface-treated form of an existing concrete making it possible to obtain sufficient adhesion strength of a new concrete to the surface of the existing concrete.

DISCLOSURE OF THE INVENTION

To solve the above-mentioned problems, the invention according to claim 1 is a system for evaluating a surface-treated form of an existing concrete in an adhesion overlay method of forming macro-unevenness in a surface layer of the existing concrete with highly-pressured water, blasting hard balls onto the surface having the macro-unevenness by a shot blast treatment (a steel shot treatment or a steel grid treatment) to form micro-unevenness, and forming a surface layer which is composed of a pavement material of a new concrete and has a given thickness on the uneven surface having the macro- and micro-unevenness, comprising: measuring means (such as a laser distance measuring meter or an ultrasonic distance measuring meter) for measuring unevenness quantities of the surface of the existing concrete after the surface-treatments at a given pitch, characteristic quantity calculating means (such as CPU or MPU) for calculating characteristic quantities of the surface-treated form of the existing concrete from collected results of the unevenness quantities measured by the measuring means, storing means (such as RAM or ROM) for storing characteristic quantities of a concrete having an ideal surface-treated form which makes it possible to obtain sufficient adhesion strength of the new concrete to the surface of the existing concrete, and evaluating means (such as CPU or MPU) for comparing the characteristic quantities calculated by the characteristic quantity calculating means with those stored in the storing means and then outputting a result obtained by the comparison.

When in the above-mentioned surface-treated form evaluating system according to a first aspect of the present invention the unevenness quantities of the surface of the existing concrete after the surface-treatment are measured at the given pitch by the measuring means, the measured unevenness quantities are automatically collected by the characteristic quantity calculating means to calculate the characteristic quantities of the surface-treated form of the existing concrete. The characteristic quantities calculated by the characteristic quantity calculating means are compared with the characteristic quantities beforehand stored in the storing means by the evaluating means to obtain an evaluated result of the surface-treated form automatically. This evaluated result is displayed on the display means such as a CRT or LCD, or printed by printing means. Thus, the surface-treated form of the existing concrete can be accurately evaluated for a short time.

According to a second aspect of the invention, as the characteristic quantities in the surface-treated form evaluating system according to the first aspect, there is used at least one of the average of the unevenness quantities and the standard deviation thereof. In this way, accurate evaluation can be made on the basis of the objective measured data.

According to a third aspect of the invention, attention is paid to the fact that the characteristic quantities are different in accordance with the particle sizes of aggregates contained in the existing concrete. The structure of surface-treated form evaluating system according to the first and second aspects further comprises average inputting means for inputting the average of particle sizes of aggregates contained in the existing concrete. In the structure, such data that the average of the particle sizes and the characteristic quantities correspond to each other are stored in the storing means, and the evaluating means compares the characteristic quantities calculated by the characteristic quantity calculating means with the characteristic quantities stored in the storing means, correspondingly to the average of the particle sizes, to evaluate the surface-treated form. In this way, more accurate evaluation can be made.

According to a fourth aspect of the invention, in the surface-treated form evaluating system according to any one of the first to third aspects, the ideal surface-treated form is a surface-treated form in which an average height (depth)of the unevenness is from 13 to 35% (more preferably 13 to 32.5%) of the maximum particle size of the aggregates contained in the existing concrete.

According to a fifth aspect of the invention, in the surface-treated form evaluating system according to any one of the first to fourth aspects, the ideal surface-treated form is specified. That is, the ideal surface-treated form is a surface-treated form in which a slope length ratio of the surface of the existing concrete is 1.13 or more. The slope length ratio is a ratio of the distance (measured length) along the unevenness of the measured surface to the straight distance (measured distance) from the start point of the measurement to the end point thereof. For example, in the case that the length along the unevenness of the measured surface in the range of a straight distance of 50 cm is 68 cm, the slope length ratio of the measured surface in this range is 1.36.

According to a sixth aspect of the invention, in the surface-treated form evaluating system according to any one of the first to fifth aspects, the ideal surface-treated form is specified. That is, the ideal surface-treated form is a surface-treated form in which 14% or more among all the unevenness of the surface of the existing concrete is unevenness having a height of 2 mm or more.

According to a seventh aspect of the invention, in the adhesion type overlay method, in which the existing concrete is subjected to a surface-treatment and then the treated surface is overlaid with a new concrete, the ideal surface-treated form of the existing concrete is specified. That is, the average height (depth) of unevenness of the surface of the existing concrete is from 13 to 35% (more preferably 13 to 32.5%) of the maximum particle size of aggregates contained in the existing concrete, and the slope length ratio thereof is 1.13 or more, and the unevenness having a height of 2 mm or more occupies 14% or more of all the unevenness. Such a surface-treated form makes it possible to gain certainly sufficient adhesion strength of the new concrete to the existing concrete surface.

BRIEF DESCRIPTION OF THE DRAWINGS

FIGS. 2(a) to 2(c) are view illustrating states of an existing concrete surface worked in the respective steps shown in FIG. 1.

FIG. 3 is a side view, partly in section, which illustrates a mechanism of a grinding and sweeping machine used in the shot blast treatment illustrated in FIG. 1.

BEST MODE FOR CARRYING OUT THE INVENTION

Referring to the attached drawings, embodiments of the present invention will be described hereinafter.

The adhesion type overlay method will be first described.

Figure 1:
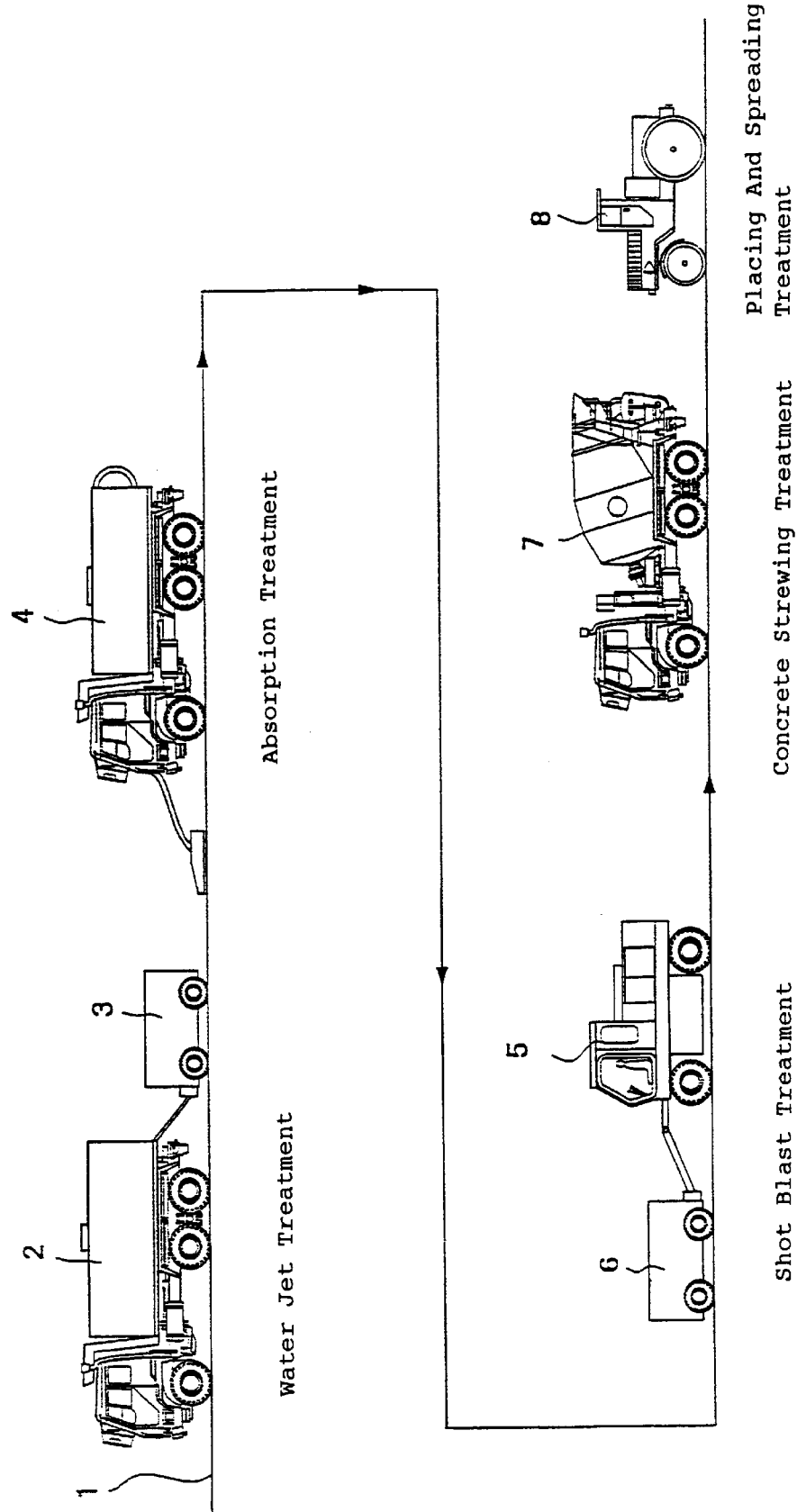
FIG. 1 is a view illustrating an outline of working steps of a repair construction of a concrete pavement according to an adhesion type overlay method.

FIG. 1 is a view illustrating an outline of working steps of a repair construction of a concrete pavement according to the adhesion type overlay method. FIGS. 2(a) to 2(c) illustrate states of an existing concrete surface worked in the respective steps.

As shown in FIG. 1, in the repair construction according to the adhesion type overlay method, water jet treatment is performed as a first surface-treatment.

In the water jet treatment, highly pressured water is jetted from a water jet nozzle of a water jet vehicle 3 pulled by a water tank vehicle and a power unit 2 toward a surface 1 of an existing concrete, so as to form a macro-unevenness surface. At this time, the jet nozzle is not fixed and traverses the direction along which the body of the vehicle advances. In this way, the unevenness is formed over the whole of the width direction of the vehicle. A vacuum vehicle 4 follows the water jet vehicle 3 to absorb and remove jetted water and scraps. FIG. 2(a) shows the state of macro-unevenness 1a obtained in this step.

The water jet treatment is treatment for cutting a working surface by jetting highly pressured water, and has been conventionally used, as a cutting technique without giving a bad influence on the cut surface, in wide fields. In general, the water jet treatment is used exclusively for cutting it. In the present invention, however, the cutting treatment is performed with movement, so as to obtain an unevenness-treated surface having a given cut depth and a given pitch.

Next, as a second surface-treatment, a shot blast treatment is performed to form a finer unevenness surface (micro-unevenness 1b). This is a treatment in which hard balls such as steel balls having a small diameter are blasted onto a treatment surface from a power unit vehicle 6 connected to the front of a tractor 5 to form unevenness. In the same manner as above, continues blast action is performed while the blast action traverses the wide direction of the vehicle.

Fine particles generated by this treatment and the steel balls are absorbed by the tractor 5, and the steel balls are collected.

The shot blast treatment is a conception including steel shot treatment and steel grid treatment. The steel shot treatment is treatment for forming micro-unevenness at the surface of an existing concrete by discharging iron balls in a spherical form (for example, steels balls having a diameter of 0.4 to 2.4 mm) thereon at a high speed by means of a machine (grinding and sweeping machine) as illustrated in FIG. 3. These balls are discharged at a speed of 70 to 90 m/second by the rotation of an impeller driven by a motor for the impeller illustrated in FIG. 3. This density of the threw balls is adjusted according to the hardness of aggregates of the existing concrete. The density can be selected within a wide range from, for example, 50 to 1000 kg/cm$^2$ in accordance with situations. The steel balls after the discharging, together with fine particles generated by grinding and sweeping, are collected by a vacuum machine. The steel balls that can be reused are separated and repeatedly used.

The steel grid treatment is treatment using iron balls in a non-spherical form instead of the spherical iron balls used in the steel shot treatment. Other ways of the treatment are the same as those of the steel shot treatment.

The non-spherical form means all forms other than a spherical form. The hard balls include balls, in a spherical or non-spherical form, composed of iron, other metals or hard materials besides metals.

By using both of the water jet treatment and the shot blast treatment, the surface 1 of the existing concrete can be made up to a surface-treated form having a desired unevenness surface (unevenness surface having macro- and micro-unevenness). These treatments can be made automatic by using a heavy working vehicle.

FIG. 2(b) illustrates the state that the micro-unevenness 1b is formed at the surface having the macro-unevenness 1a.

Next, the overlay surface having the macro-unevenness 1a is overlaid with a new concrete. This work is performed by strewing the new concrete from a concrete mixer vehicle 7 following the tractor 5. The road surface is made flat by placing and spreading treatment using a rolling compaction working vehicle 8 following this vehicle 7 (see FIG. 2(c)).

Subsequently, the concrete is cured and hardened to finish the overlay work.

In the repair work of the concrete pavement according to the adhesion type overlay method, as performed as above, it is necessary to evaluate whether or not the existing concrete surface 1 is an ideal surface-treated form, that is, a surface-treated form which makes it possible to obtain a sufficient anchor effect on the new concrete by the unevenness formed at the existing concrete surface 1 when the existing concrete is overlaid with the new concrete.

The present invention provides a surface-treated form evaluating system and an evaluating process which makes it possible to evaluate the surface-treated form of the existing concrete surface 1 on the spot of the repair construction of a concrete pavement according to the adhesion type overlay method.

The following will describe the surface-treated form evaluating system according to the present invention.

Figure 4:
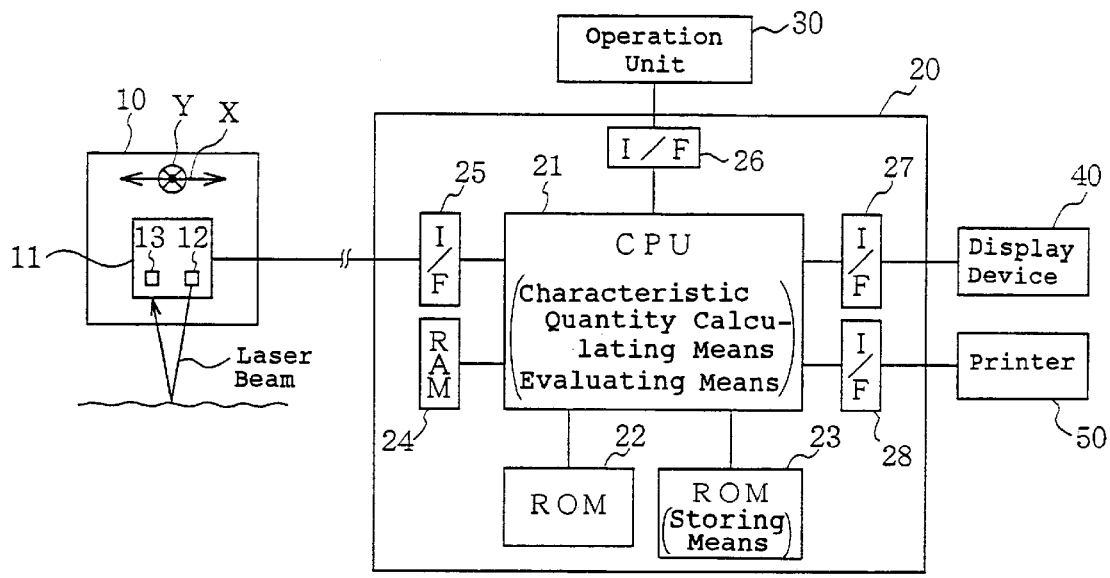
FIG. 4 is an outline view of a surface-treated form evaluating system according to an embodiment of the present invention.

FIG. 4 is an outline view of a surface-treated form evaluating system according to an embodiment of the present invention, and illustrates a system comprising a measuring device 10 for measuring, at a given pitch, the unevenness quantities of the existing concrete surface 1 after the surface-treatment; an evaluating device 20 for evaluating the surface-treated form on the basis of the measured values by the measuring device 10; an operation unit 30 for inputting operation indications and various values into the evaluating device 20; a display device 40 for displaying various data outputted from the evaluating device 20 on a CRT screen or the like; and a printer 50 for printing the various data if necessary.

Figure 5:
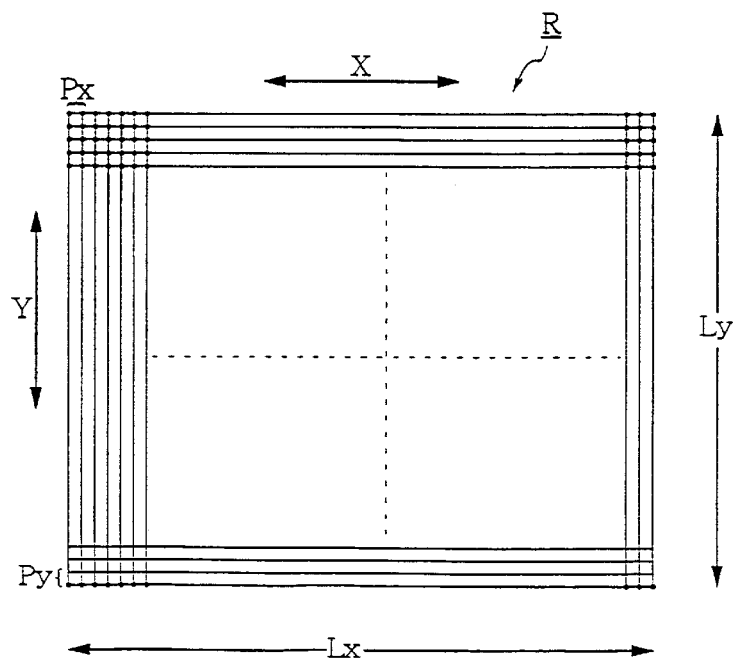
FIG. 5 is a view for explaining the measuring method by a measuring device illustrated in FIG. 4.

The measuring device 10 has a laser displacement meter 11 for measuring the unevenness quantities of the existing concrete surface 1 with super-high accuracy, and a non-illustrated moving mechanism for holding this laser displacement meter 11 and moving it at a constant speed in the horizontal direction (XY direction in FIG. 4). The laser displacement meter 11 has a laser oscillator (LD) 12 for emitting a laser beam toward the existing concrete surface 1 at very short intervals of pulses, and a light receiving element (PD) 13 for detecting a reflective laser beam from the existing concrete surface 1, in order to measure the unevenness quantity on the basis of the period from the emission of the laser beam to the return thereof. In the measuring device 10, the laser displacement meter 11 is moved in the X and Y directions by the moving mechanism while the meter 11 is operated. In this way, as shown in FIG. 5, the meter 11 scans a measuring range R having a given area Lx×Ly (for example, Lx×Ly=50 cm×50 cm), in a matrix form, at given pitches px and py (for example, px=2 mm and py=2 mm) to take measurements. The measured data are successively transmitted to the measuring device 10.

The evaluating device 20 has a CPU 21, a program ROM 22 in which control programs to be executed by the CPU 21 are stored, a data ROM 23 in which characteristic quantities of an ideal surface-treated form which have been beforehand obtained from tests and measurements, that is, data on the average of the unevenness quantities and data on the standard deviation thereof, a RAM 24 which is used as a working area when the CPU 21 executes various processings, and interfaces (I/F) 25–28 for interconnecting this evaluating device 20 to external devices.

In the data ROM 23, the following are stored: characteristic quantities (that is, data on the average of the unevenness quantities and data on the standard deviation thereof) of ideal surface-treated forms obtained when the adhesion strength between an existing concrete and a new concrete is measured with a change in the average of the particle sizes of aggregates contained in the existing concrete (which will be referred to as an average particle size hereinafter). These are stored correspondingly to the respective average particle sizes of the respective aggregates.

The CPU 21 controls the whole of the surface-treatment form evaluating system in accordance with indications through the operation unit 30, and collects measured data on the whole of the measuring range R, which are successively forwarded from the measuring device 10, to calculate the characteristic quantities, within the measured range R, of the surface-treated form of the existing concrete surface 1, that is, the average of the unevenness quantities and standard deviation thereof and then store them in given memory areas of the RAM 24. When the average particle size of the aggregates contained in the existing concrete, which is an object of evaluation, is inputted through the operation unit 30 to indicate the execution of evaluation, the average of the unevenness quantities and the standard deviation thereof, as ideal values, corresponding to the inputted average particle size are read out from the data ROM 23 so as to compare them with the average of the unevenness quantities, as the measured values, and the standard deviation which are stored in the RAM 24. The difference between the ideal values and the measured values is displayed as evaluation results on the display device 40. The display content on the display device 40 can be changed by the indication through operation unit 30. Thus, it is possible to display the evaluated results and the various collected data, display the unevenness quantities of the respective measuring points, display a graph of the frequency distribution of the unevenness quantities, as shown in, for example, FIGS. 9 to 14, or display the data stored in the data ROM 23 in a table. If necessary, the evaluated results, the various collected results, and the like can be printed on paper with the printer 50 and kept.

As described above, in the surface-treated form evaluating system of this embodiment, it is possible to perform successively the collection of the measured values, the calculation of the characteristic quantities of the surface-treated forms, and the comparison of the calculated characteristic quantities with the characteristic quantities of the ideal surface-treated forms which have been beforehand obtained in the evaluating device 20 only by setting the measuring device 10 on the existing concrete surface 1, the surface-treated form of which should be evaluated, and then measuring the unevenness quantities thereof. The evaluated results thereof can be displayed on the display device 40. It is therefore possible to evaluate the surface-treated form of the existing concrete accurately for a short time on the repair construction spot.

In the above-mentioned embodiment, the following is displayed as an evaluated result: the difference between the average of the unevenness quantities of the existing concrete surface, which is an object for evaluation, and the standard deviation thereof and the characteristic quantities of the ideal surface-treated forms which have been beforehand obtained. The present invention is not however to this example. For example, when about such averages and standard deviations the difference between the ideal values thereof and the measured values thereof is below an allowable value which has been beforehand set, the following fact may be displayed: the existing concrete surface has an ideal surface-treated form.

If there are stored in the data ROM 23 not only the data corresponding to the average particle size of the aggregates of the existing concrete but also other detailed data based on different conditions, corresponding to other materials such as mortar of the existing concrete, a material of a new concrete pavement, and the like and further an ideal value corresponding to the detailed condition specified through the operation unit 30 is used, more accurate evaluation can be performed.

In the case that the average particle size of aggregates does not change very much in accordance with any object to be evaluated, it is not necessary to store in the data ROM 23 the data on the average of the unevenness quantities and the data on the standard deviation thereof in the state that they are caused to correspond to the average particle size of the aggregates.

In the system shown in FIG. 4, the evaluating device 20, the operation unit 30 and the display device 40 are separately composed, but all other units than the measuring device 10 may be integrated with the evaluating device 20. An operation panel having the functions of both of the operation unit 30 and the display device 40 may be fitted to the evaluating device 20.

It is not necessary to have both of the display device 40 and the printer 50 as means for outputting evaluated results. The system of the present invention may have only either one of them.

The system of the present invention may have data storing means for causing measured data, collected data, evaluated results and the like to be stored in a recording medium such as a floppy disc or an optical disc, as well as the above-mentioned units or devices. If the data collected on the spot can be stored in the floppy disc or the like, the measured data can be brought back to a laboratory and analyzed or caused to function as a data base. Therefore, the measured data can be used as reference data for a subsequent research or construction.

As the evaluating device 20 a personal computer may be used and as the operation unit 30 a keyboard attached to this may be used. In this case, if a small and light computer such as a notebook size personal computer is used as the evaluating device 20, it can easily be carried on the construction spot. Thus, evaluating work can be effectively performed. The communication function of the personal computer may be used to transmit data collected on the construction spot to a laboratory or the like.

EXAMPLES

The following will describe the surface-treated form evaluating system by way of Example.
[Grasp of a Surface-treated Form]
Tensile stress and shear stress simultaneously act the interface between new and old concretes. In order that the new concrete is not exfoliated, it is important to have sufficient strength against these stresses.

Thus, in order to grasp the surface-treated form making it possible to obtain sufficient strength at the interface, paying attention to tensile strength, the inventors prepared plural surface-treated forms by subjecting the surfaces of an existing concrete to different surface-treatment methods, and carried out tensile tests on the spot.

Figure 6:
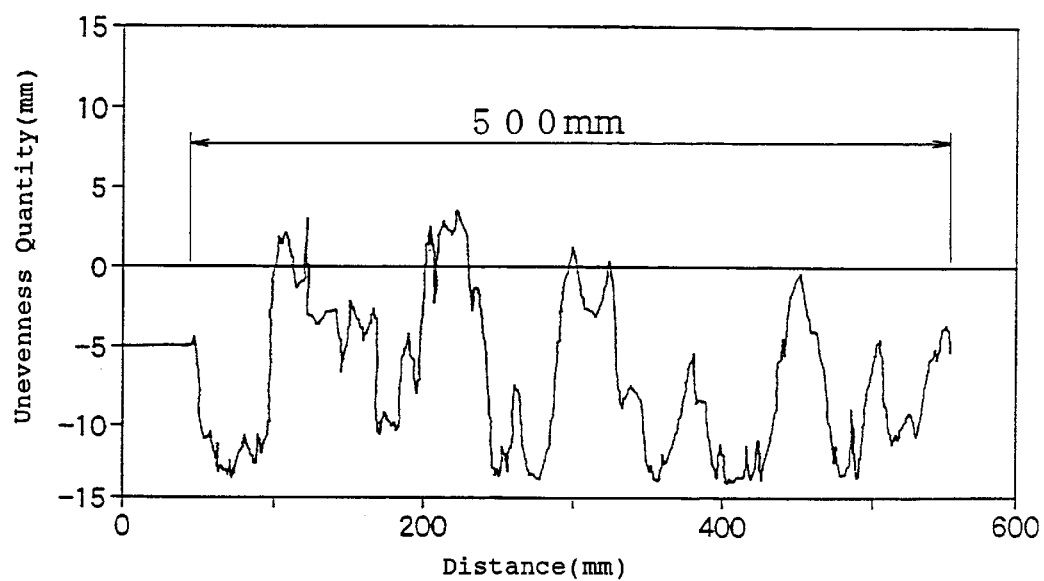
FIG. 6 is a view showing an example of surface-treated forms obtained by the measurement.

As the surface-treatment methods, there was adopted any one or a combination of a water jet treatment, a shot blast treatment and a cutting treatment with a chipper. Details thereof are shown in Table 1. Three areas (50 cm×50 cm) in the existing concrete surface were subjected to each of the surface-treatment methods. Before each of the areas was overlaid with a sample for tensile tests, the unevenness quantity of the existing concrete surface after the surface-treatment was measured with a measuring device using a laser displacement meter. An example of surface-treated forms obtained by the measurement is shown in FIG. 6. The pitch of the measurement was 0.2 mm, and the length of the measurement was 50 cm. Twenty measuring lines in total were measured.

TABLE 1

Sorts of surface-treatment methods, and results of the measurement of average depth

| Method No. | Method | Average depth (mm) |
|---|---|---|
| A-1 | WJ1700 kgf/cm², Nozzle angle: 22°, Traverse speed: 30 cm/sec. | 6.71 |
| A-2 | WJ1900 kgf/cm², Nozzle angle: 22°, Traverse speed: 30 cm/sec. | 10.16 |
| A-3 | WJ1050 kgf/cm², One nozzle, Speed: 0.14 m/min. | 13.66 |
| B-1 | Steel shot TSH170 250 kg/m² | 2.33 |
| B-2 | Steel shot TSH170 750 kg/m² | 3.99 |
| B-3 | Steel shot TSH170 1500 kg/m² | 4.92 |
| C-1 | Steel grid TGE200 250 kg/m² | 1.81 |
| C-2 | Steel grid TGE200 750 kg/m² | 2.87 |
| C-3 | Steel grid TGE200 1500 kg/m² | 3.89 |
| D-1 | Cutting + WJ1700 kgf/cm², Nozzle angle: 22°, Traverse speed: 30 cm/sec. | 10.27 |
| D-2 | Cutting + WJ1900 kgf/cm², Nozzle angle: 22°, Traverse speed: 30 cm/sec. | 11.34 |
| D-3 | Cutting + WJ1050 kgf/cm², One nozzle, Speed: 0.14 m/min. | 14.49 |
| D-4 | Cutting + WJ 900 kgf/cm², Rotating nozzle Speed: 0.16 m/min. | 11.36 |
| E-1 | Cutting + Steel shot TSH170 250 kg/m² | 3.80 |
| E-2 | Cutting + Steel shot TSH170 750 kg/m² | 3.92 |
| E-3 | Cutting + Steel shot TSHI70 1500 kg/m² | 5.73 |
| E-4 | Cutting + Steel grid TGE200 750 kg/m² | 4.89 |
| F-1 | WJ1700 kgf/cm², Nozzle angle: 22° + Steel shot TSH170 100 kg/m², Traverse speed: 30 cm/sec. | 7.51 (6.30) |
| F-2 | WJ1900 kgf/cm², Nozzle angle: 22° + Steel shot TSH170 100 kg/m², Traverse speed: 30 cm/sec. | 10.77 (10.05) |

TABLE 1-continued

Sorts of surface-treatment methods, and results of the measurement of average depth

| Method No. | Method | Average depth (mm) |
|---|---|---|
| F-3 | WJ1050 kgf/cm², 0.14 m/min One nozzle + Steel shot TSH170 100 kg/m² | 13.16 (14.00) |
| F-4 | WJ1900 kgf/cm², Nozzle angle: 22° + Steel grid TGE200 100 kg/m², Traverse speed: 30 cm/sec. | 8.82 (8.63) |

Notes:
The values inside parentheses are measured values before shot or grid was received.

Figure 7:
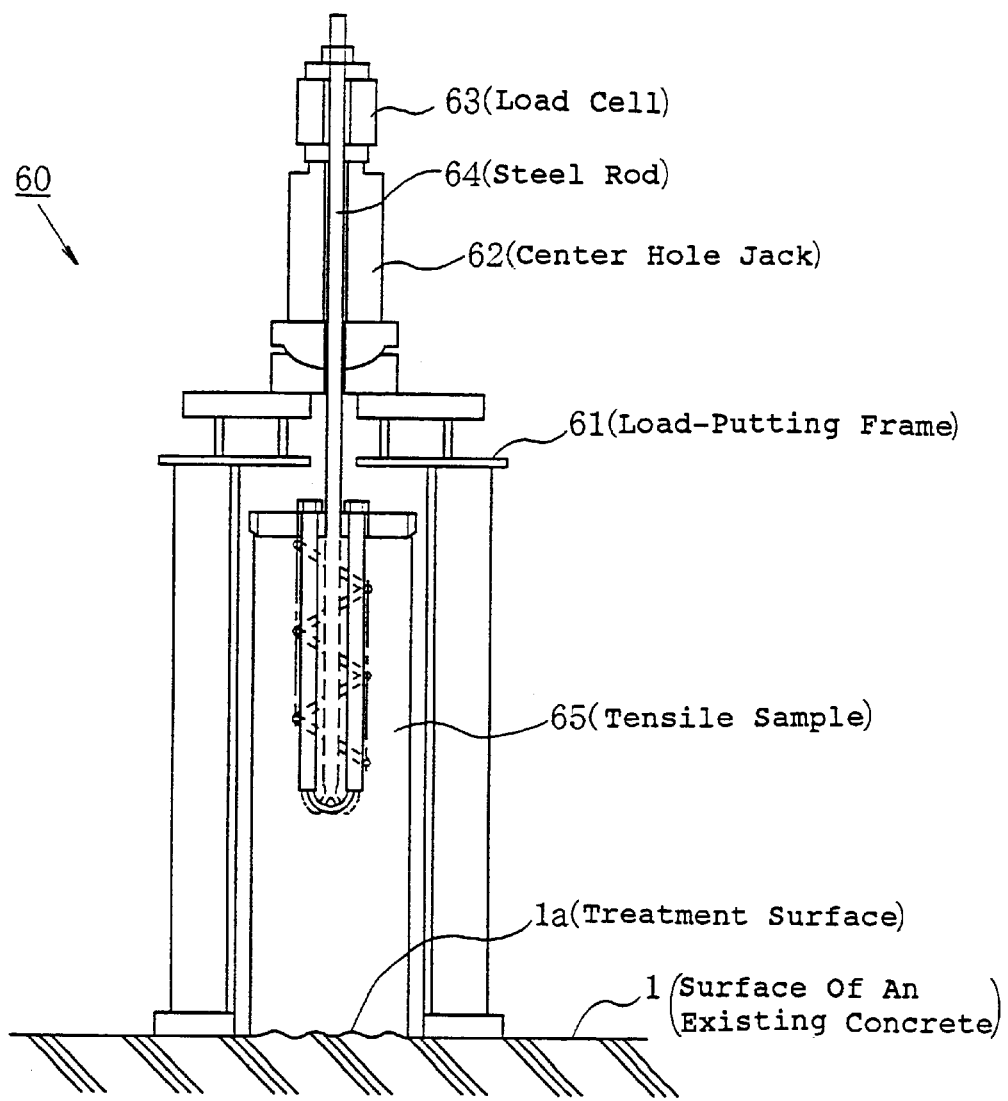
FIG. 7 is a cross section of a structure of a tensile test device.

[Tensile Test Method and Used Materials]
FIG. 7 shows a structure of a tensile test device. This tensile test device 60 is substantially composed of a self-support load-putting frame 61 set on an existing concrete surface 1, which is an object to be measured, a center hole jack 62 fixed on the load-putting frame 61, a load cell 63 for driving the center hole jack 62, and a PC steel rod 64 which can be held by the center hole jack 62 and moved upwards and downwards. A sample 65 in which the lower portion of the PC steel rod 64 was embedded was formed on a treatment surface 1a of an existing concrete surface 1, and subsequently the PC steel rod 64 was strained with the center hole jack 62.

The tensile test device 60 was used to perform a tensile test of the sample 65 having a cylindrical shape with a diameter of 20 cm and a height of 60 cm. A concrete used in the test was a normal Portland cement having a ratio of water to cement of 39%, a slump of 6 to 7 cm, a designed bending strength of 50 kgf/cm², and a maximum particle size of coarse aggregates of 40 mm. The treatment surface 1a was cleaned with a wire brush before overlay with the concrete. This was repeated. Thus, 6 samples 65 were made on treatment surfaces 1a and then they were subjected to tensile tests.

Figure 8:
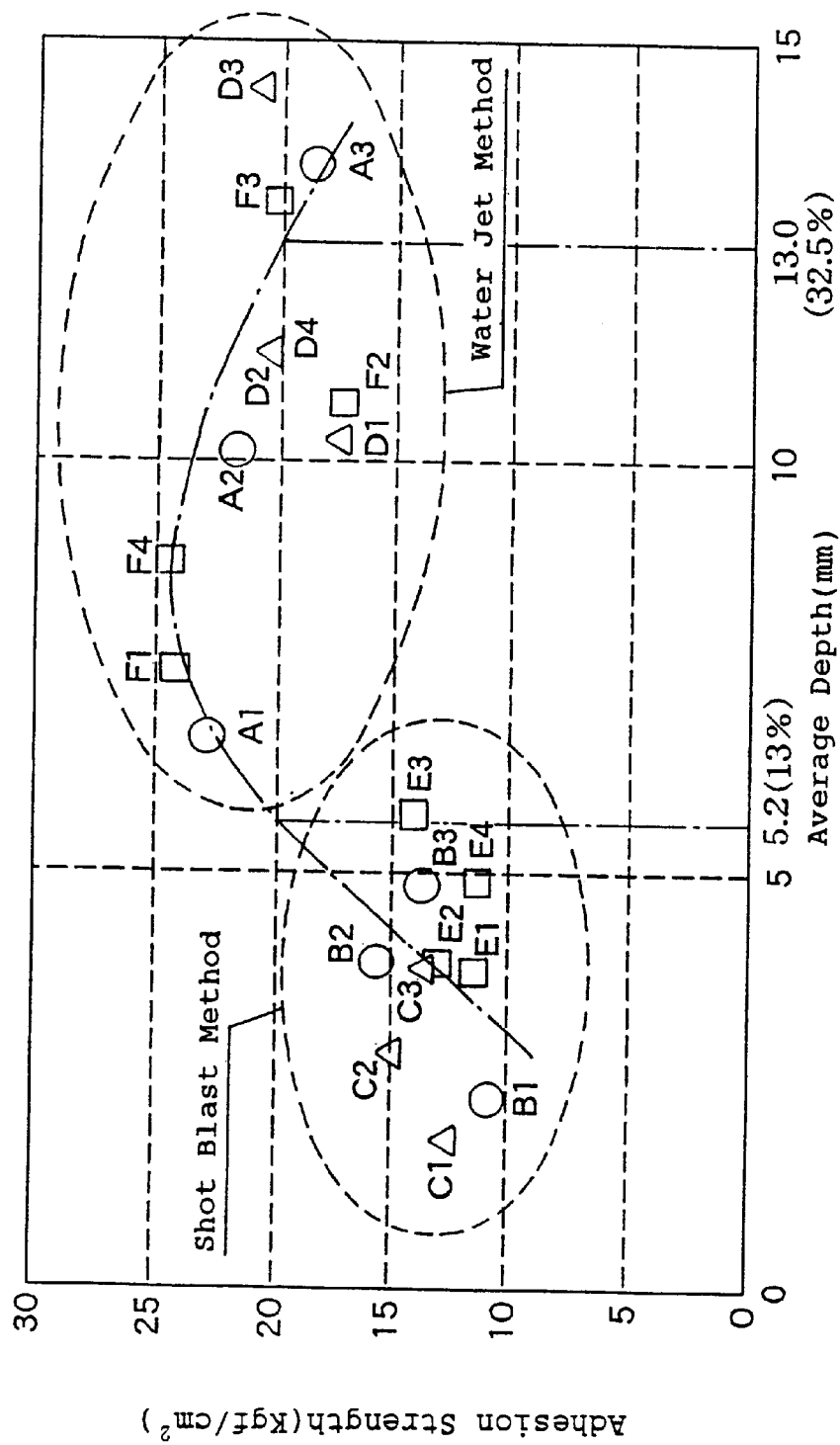
FIG. 8 is a graph showing the relationship between the average depth obtained by arithmetically averaging the depths from tips of surface-treated convex portions to bottoms of concave portions and adhesion strength.
Figure 9:
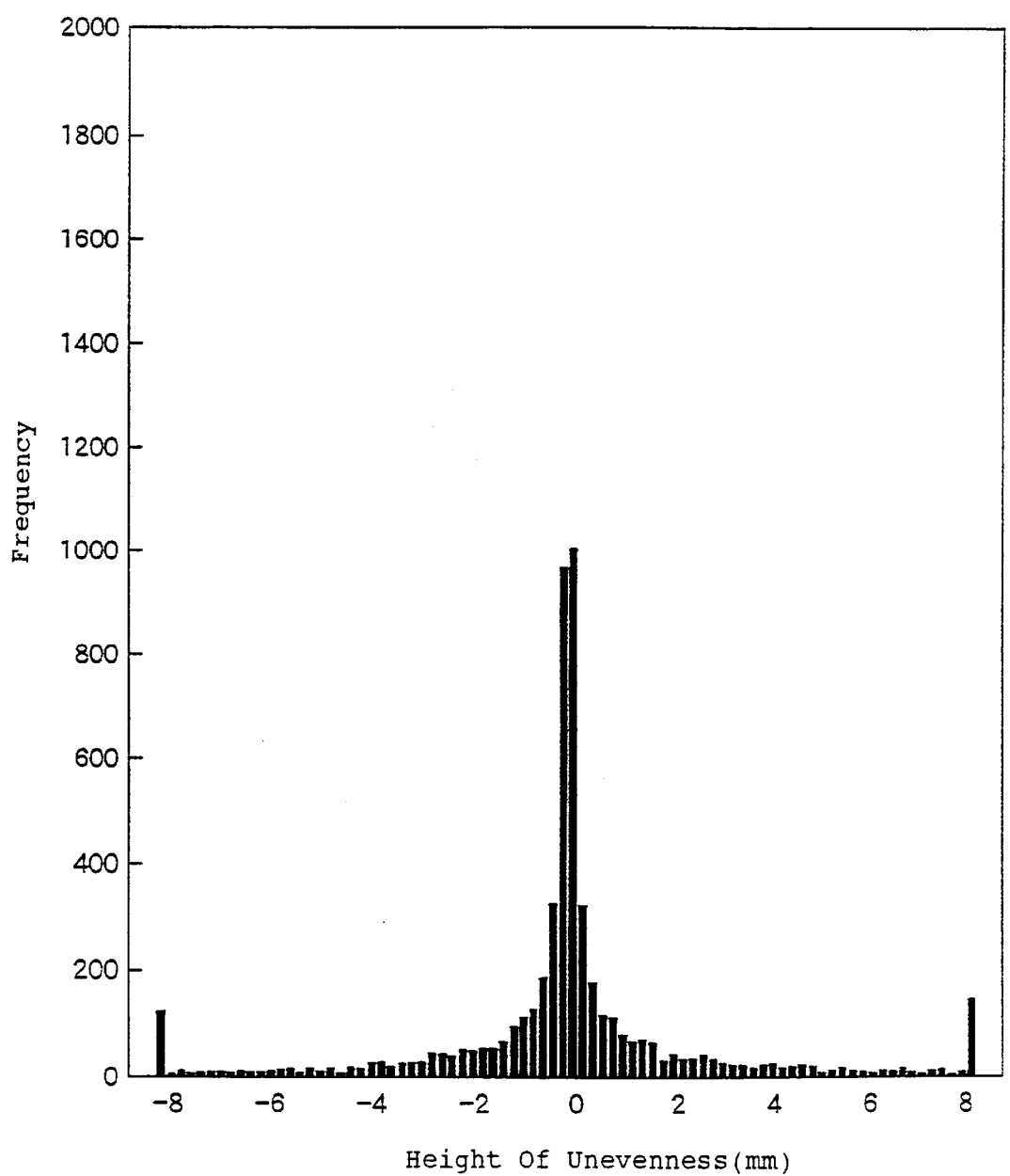
FIG. 9 is a graph of an example of frequency distribution of unevenness heights of a surface treated by a specific method.
Figure 10:
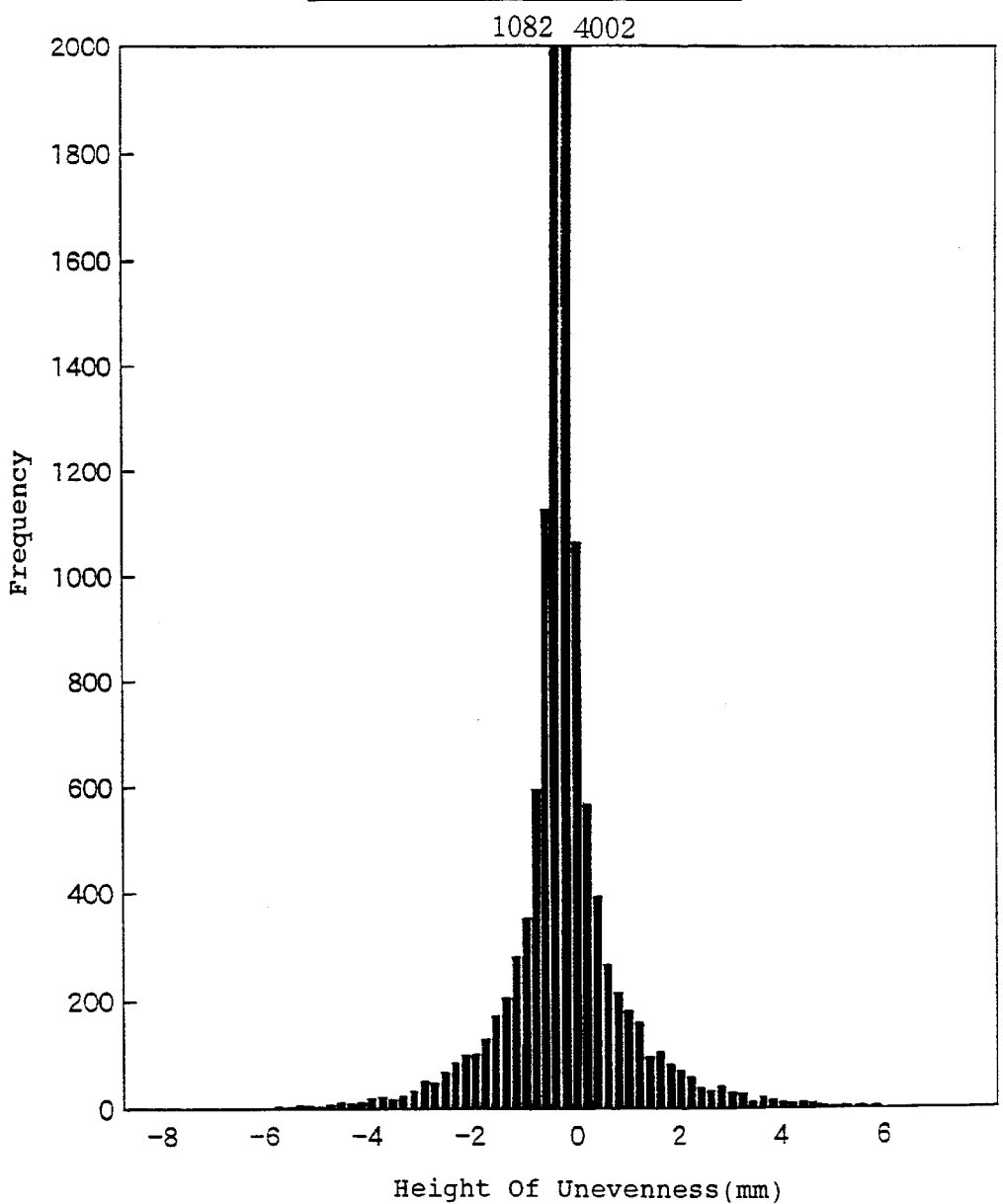
FIG. 10 is a graph of an example of frequency distribution of unevenness heights of a surface treated by a specific method.
Figure 11:
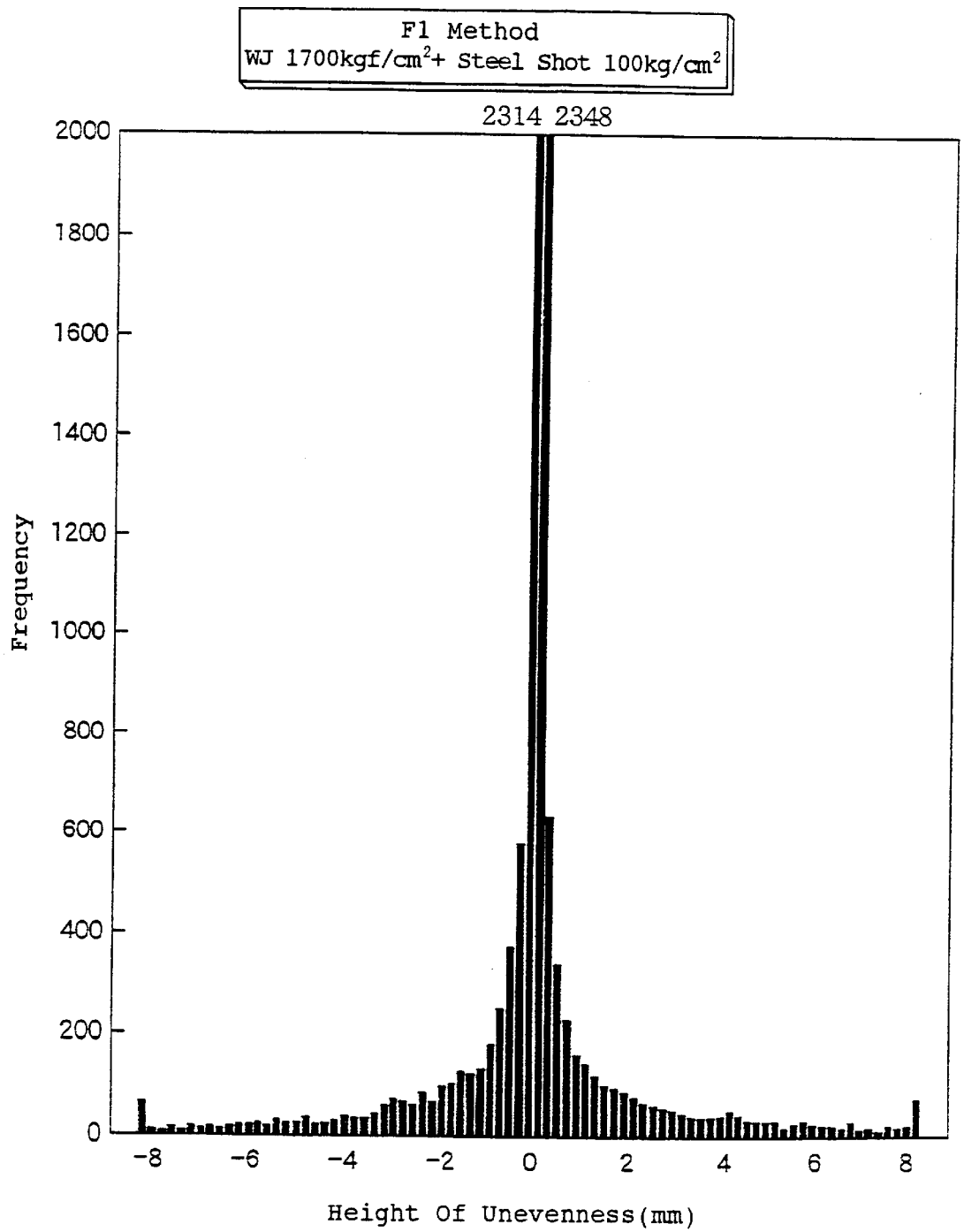
FIG. 11 is a graph of an example of frequency distribution of unevenness heights of a surface treated by a specific method.
Figure 12:
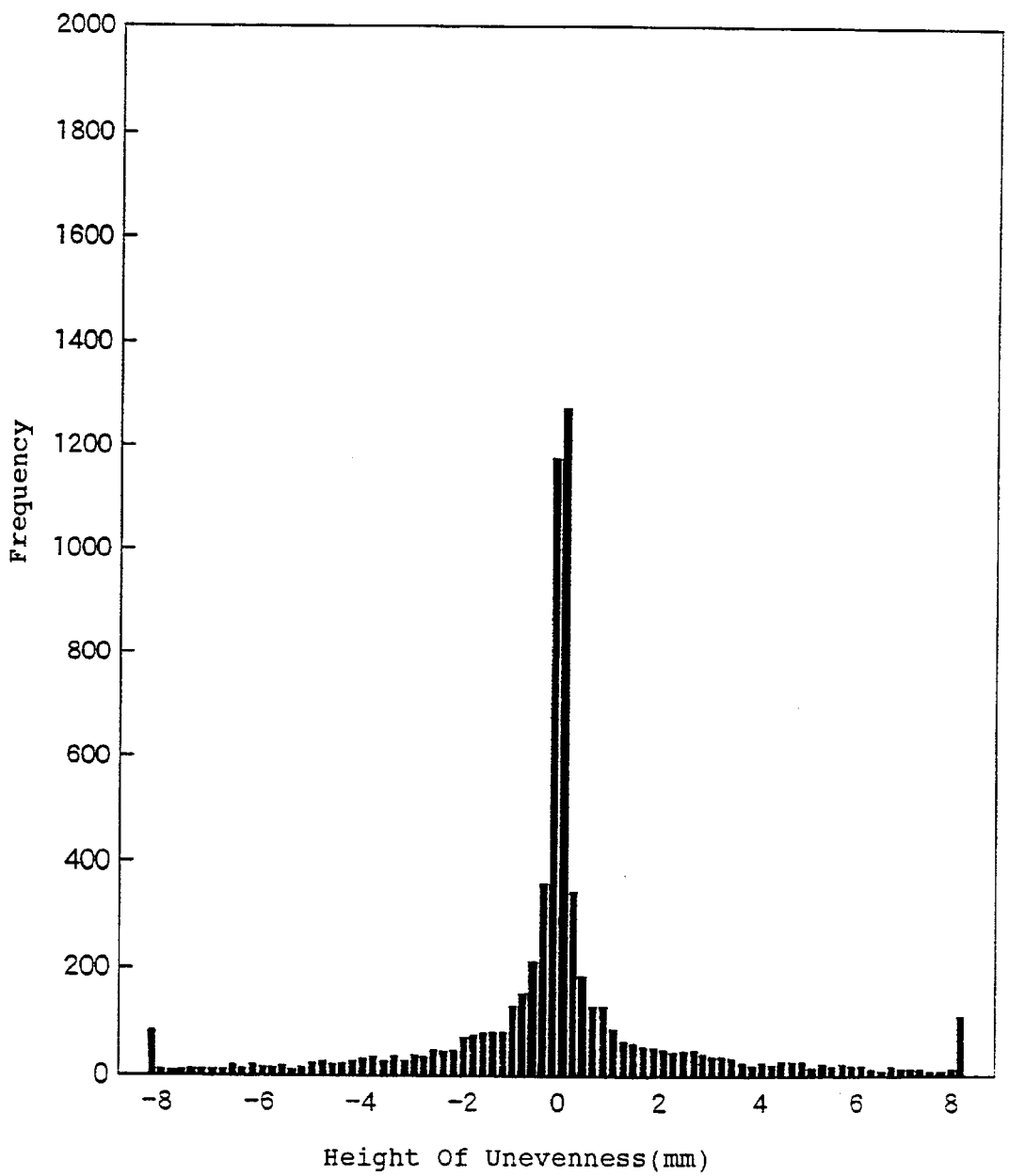
FIG. 12 is a graph of an example of frequency distribution of unevenness heights of a surface treated by a specific method.
Figure 13:
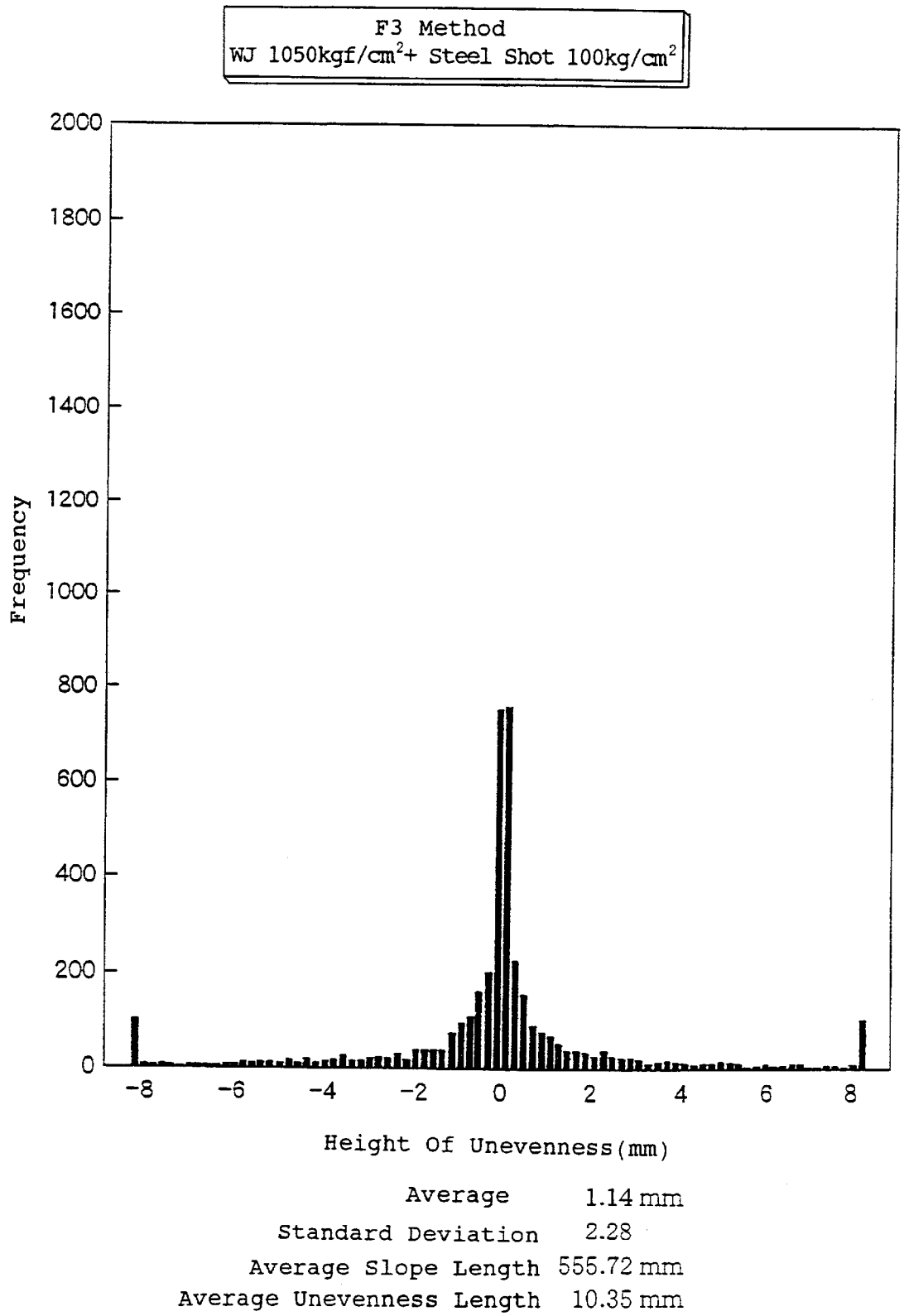
FIG. 13 is a graph of an example of frequency distribution of unevenness heights of a surface treated by a specific method.
Figure 14:
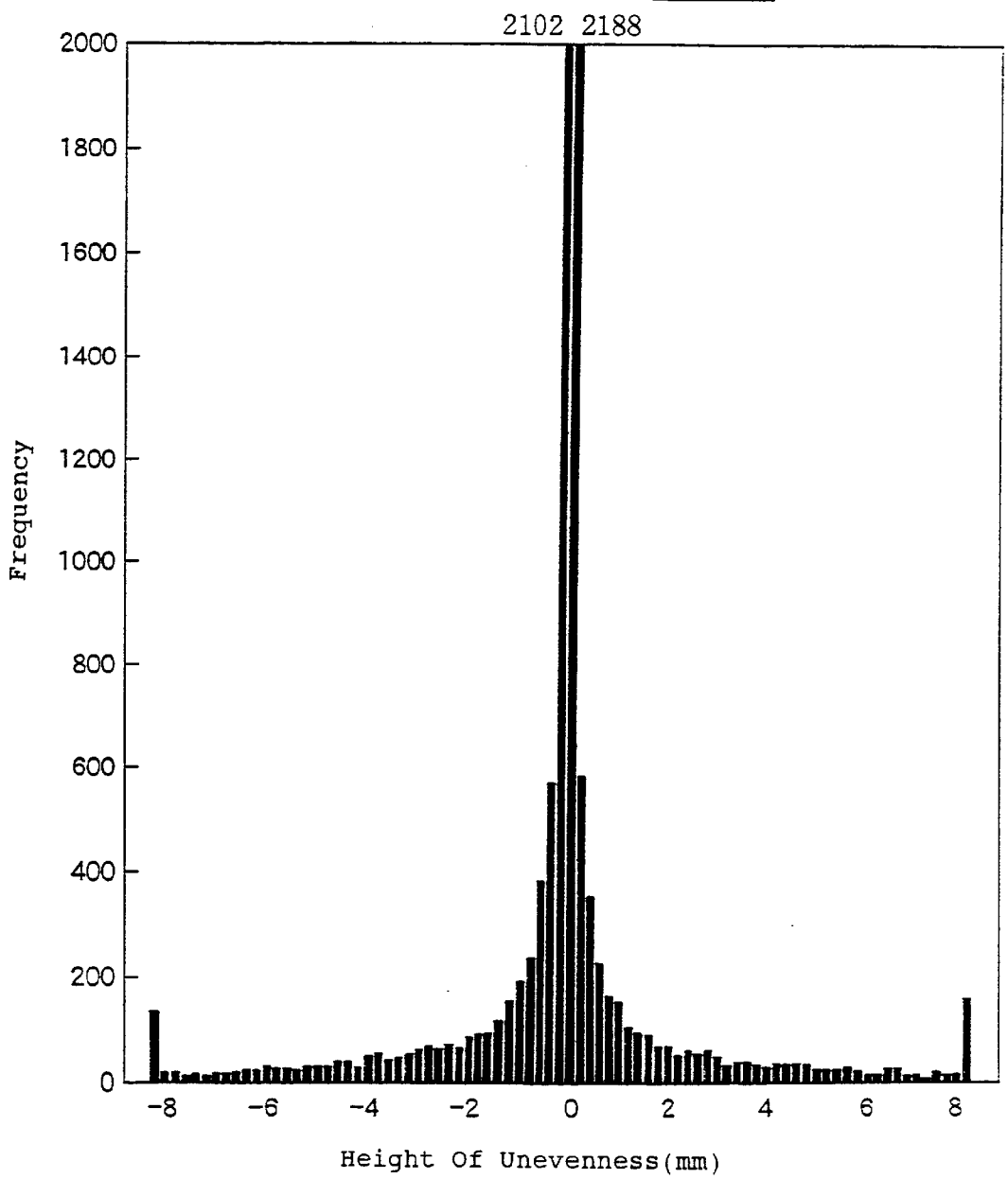
FIG. 14 is a graph of an example of frequency distribution of unevenness heights of a surface treated by a specific method.

[Tensile Test Results and Consideration]
FIG. 8 is a graph showing the relationship between the average depth obtained by arithmetically averaging the depths from tips of surface-treated convex portions to bottoms of concave portions and adhesion strength. It can be understood from this graph that the surface-treated forms having an appropriate depth make it possible to obtain high adhesion strength and the method using water jet treatment is very effective.

It can also be understood that in order to obtain an adhesion strength of 20 kgf/cm² or more, which is a sufficient adhesion strength, in the case that the maximum particle size of coarse aggregates is 40 mm, the average depth of the unevenness needs to be within the range of about 5.2 mm to 13.0 mm. If this range is converted to a range of percentages to the maximum particle size of the coarse aggregates, the range is from 13% to 32.5% (corresponding to the fourth and seventh aspects).

FIGS. 9 to 14 show the frequency distribution of the unevenness height according to the respective methods. These are results measured with a measuring device using the above-mentioned laser displacement meter. Concerning all surface-treated forms, the treated surface whose heights of the unevenness was somewhat broadly distributed so that the skirt of the shape of the distribution was spread was compared with the treated surface whose heights thereof was unevenly distributed around 0 mm, in which the difference between the heights of convex and concave portions was small. As a result, the former had higher adhesion strength. According to all the method using water jet, distribution shapes of the former were obtained. It can be understood from this result that the method in which the surface after water jet treatment is subjected to shot blast treatment is preferable and in particular the F4 method is most preferable for the surface-treating method adopted in the adhesion type overlay method.

Figure 15:
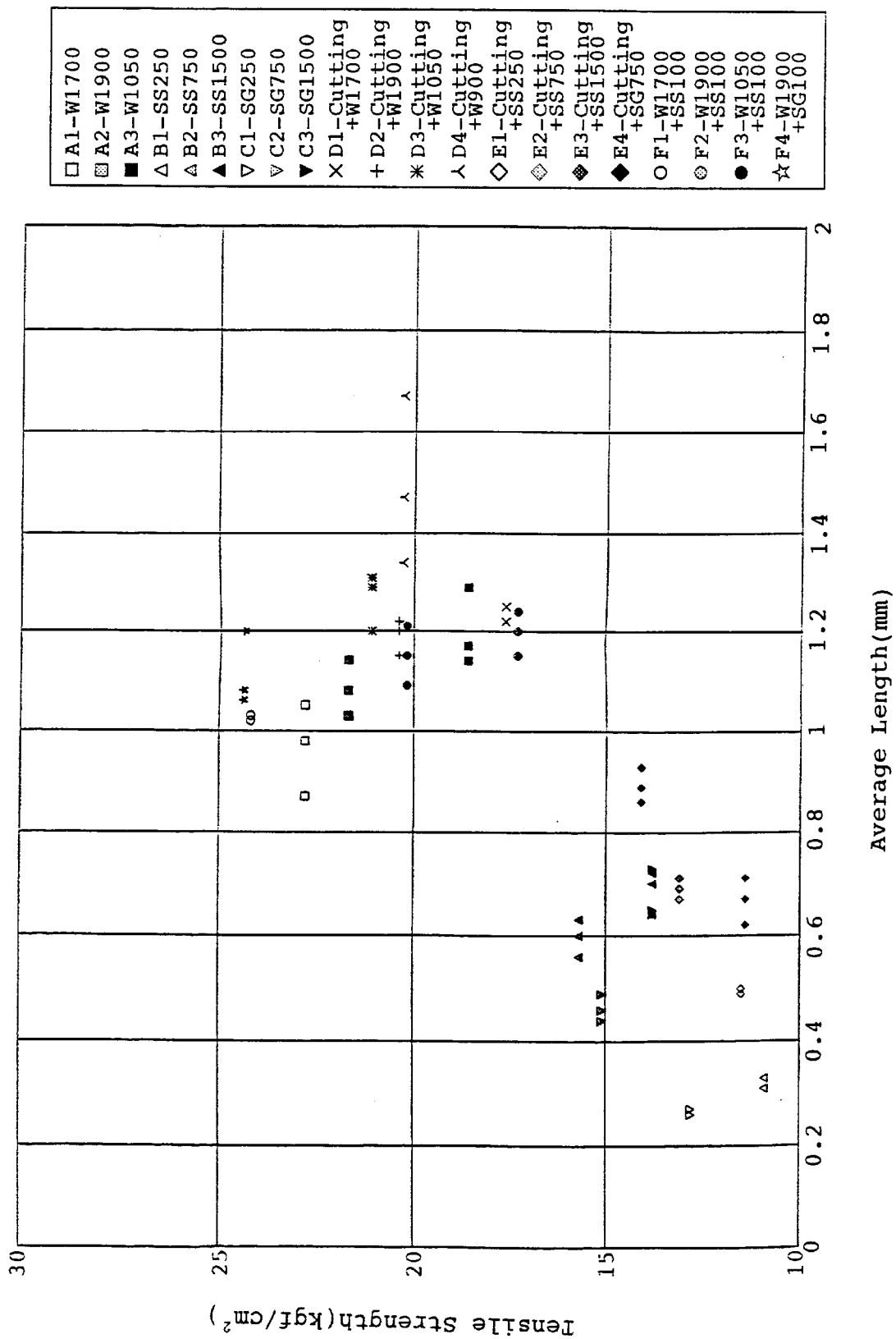
FIG. 15 is a graph showing the relationship between the average of unevenness quantities according to the respective methods and tensile strength.
Figure 16:
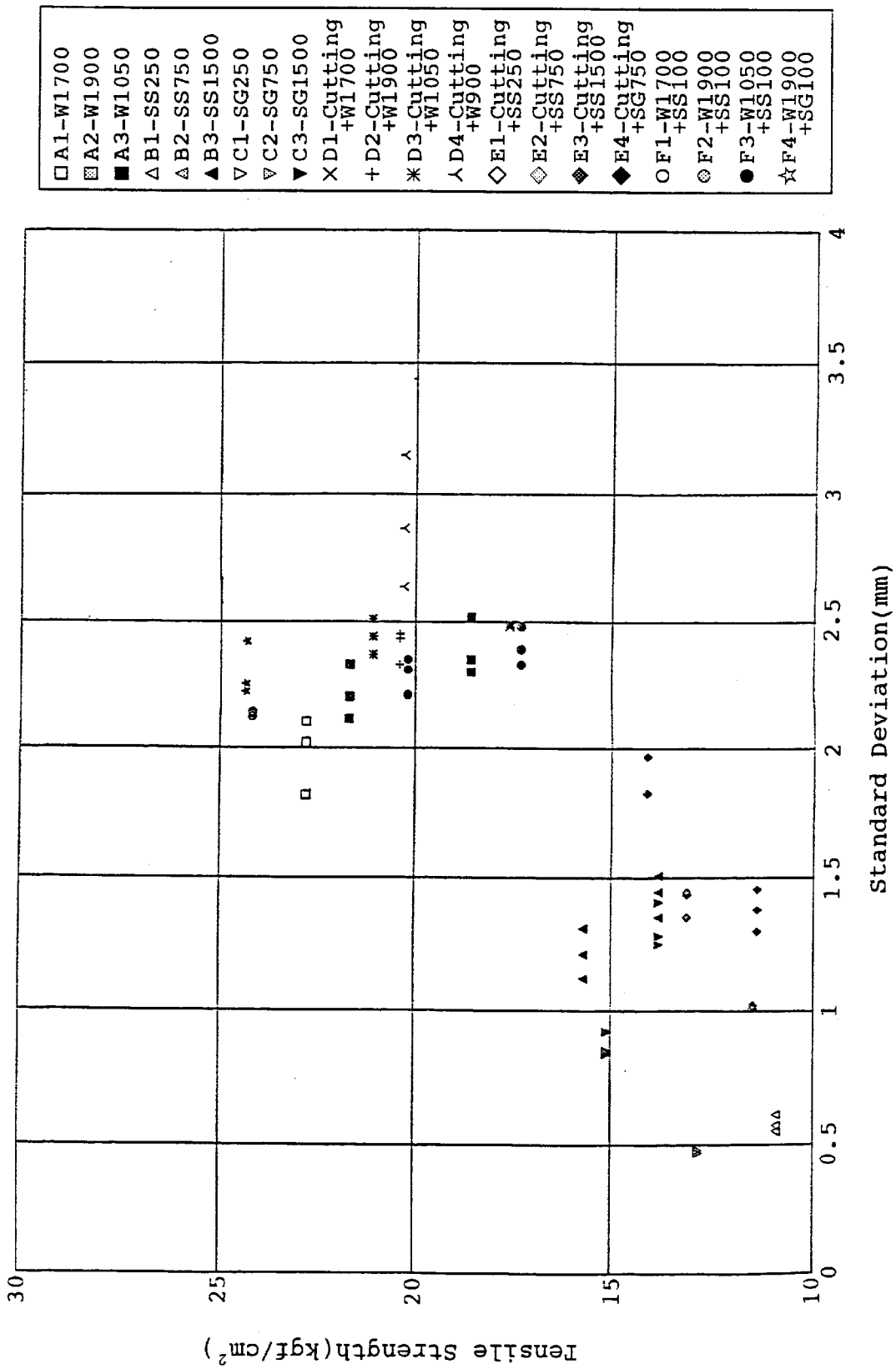
FIG. 16 is a graph showing the relationship between the standard deviation of unevenness quantities according to the respective methods and tensile strength.
Figure 17:
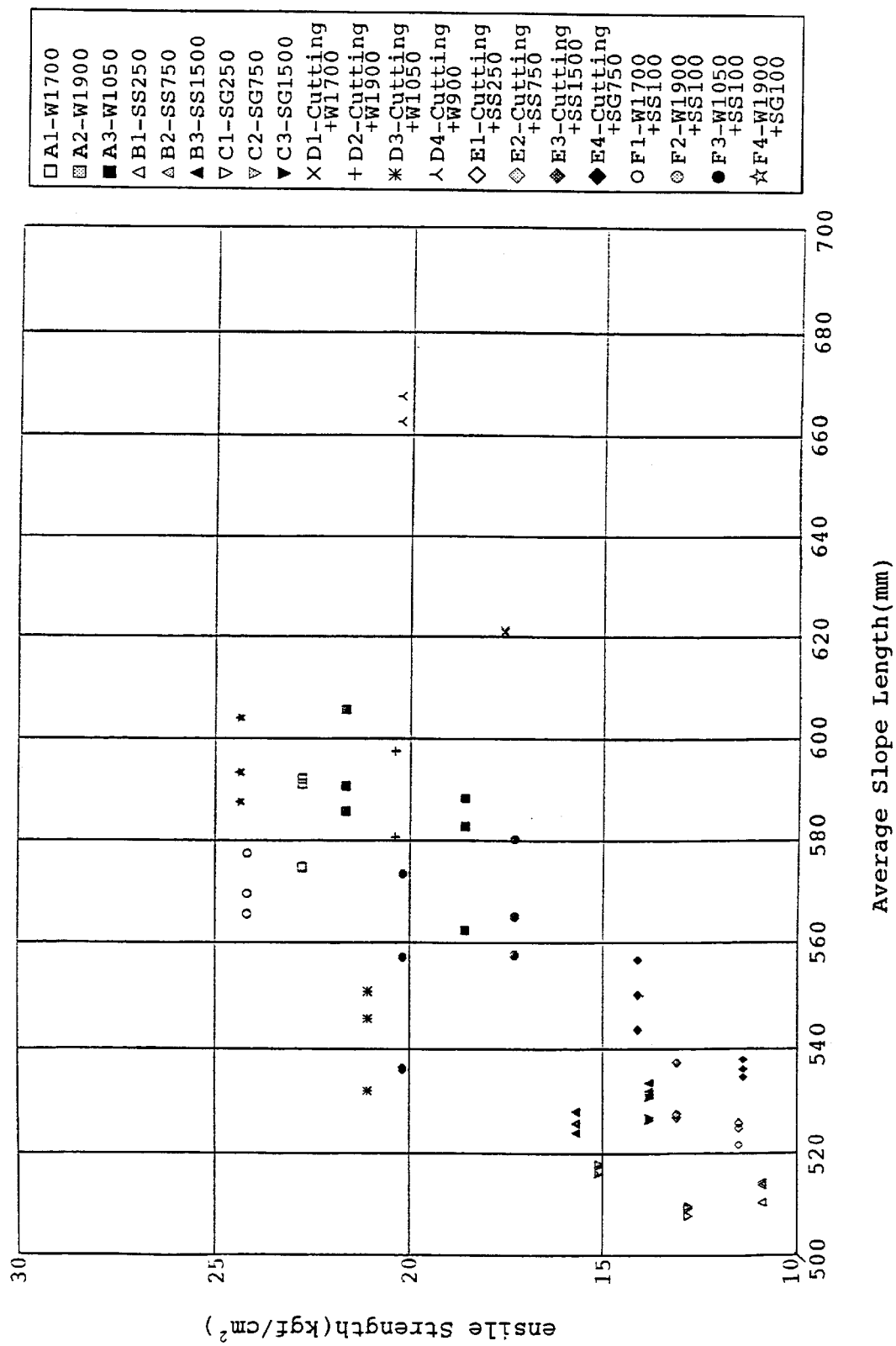
FIG. 17 is a graph showing the relationship between the average slope length of the unevenness according to the respective methods and tensile strength.
Figure 18:
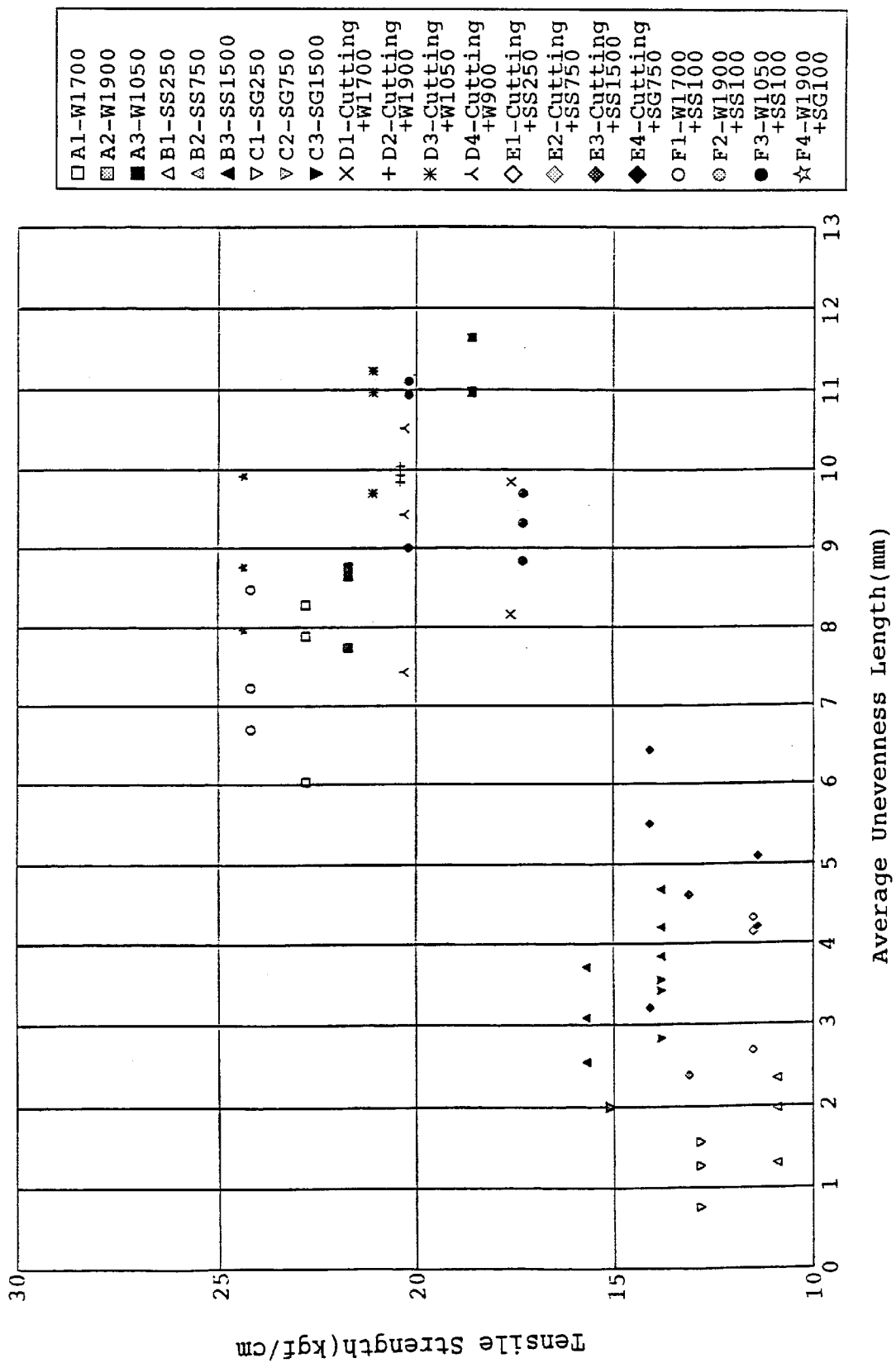
FIG. 18 is a graph showing the relationship between the average unevenness length according to the respective methods and tensile strength.

FIG. 15 is a graph showing the relationship between the average of unevenness quantities according to the respective methods and tensile strength. FIG. 16 is a graph showing the relationship between the standard deviation of unevenness quantities according to the respective methods and tensile strength. FIG. 17 is a graph showing the relationship between the average slope length of the unevenness according to the respective methods and tensile strength. FIG. 18 is a graph showing the relationship between average unevenness length according to the respective methods and tensile strength. These are graphs in which measured values by means of the measuring device using the above-mentioned laser displacement meter were collected for the respective methods and these values were plotted. The average of the unevenness quantities is defined as follows. Higher values than a predetermined standard point (the unevenness quantity=0) are measured as positive values and lower values than the standard point are measured as negative values, and such measured values are obtained for the whole of the treatment surface 1. The average of the obtained values is the average of the unevenness quantities. The average slope length is a value obtained by calculating the length from the tip of a convex portion to the bottom of a concave portion, along its surface, over all of the treatment surface 1a and then averaging the obtained values. The average unevenness is a value obtained by calculating the depth from the tip of a convex portion to the bottom of a concave portion over all of the treatment surface 1a and then averaging the obtained values.

It can be understood from all of the above-mentioned relationships that the method in which the surface after water jet treatment is subjected to shot blast treatment is preferable as a surface-treating method adopted for the adhesion type overlay method. In particular, the F4 method is most preferable.

Figure 19:
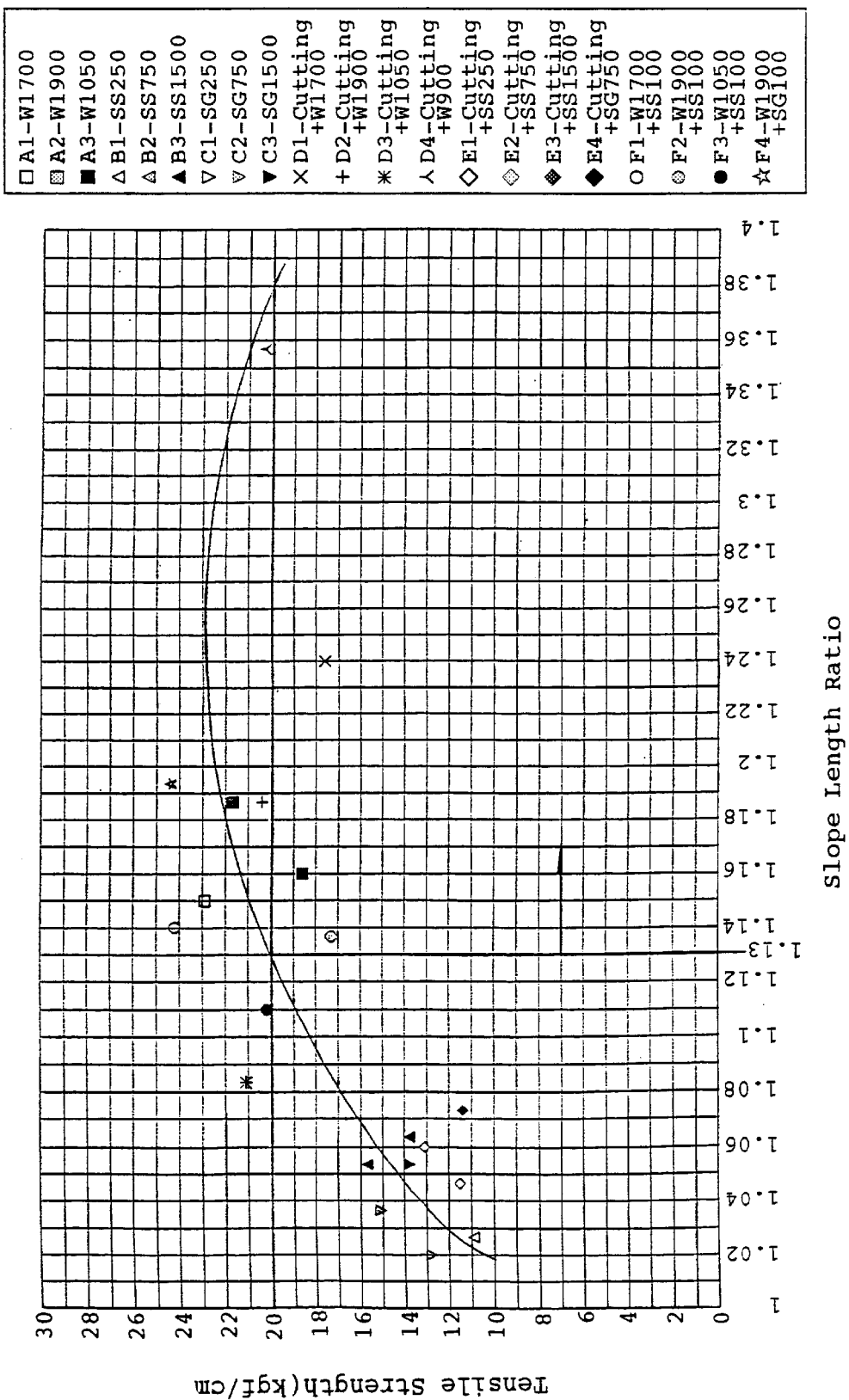
FIG. 19 is a graph showing the relationship between the slope length ratio of the unevenness according to the respective methods and tensile strength.

FIG. 19 is a graph showing the relationship between the slope length ratio of the unevenness according to the respective methods and tensile strength. It can be understood from the measured results that in order to obtain a sufficient adhesion strength of 20 kgf/cm$^2$ or more the slope length ratio should be 1.13 or more (corresponding to the fifth aspect).

Figure 20:
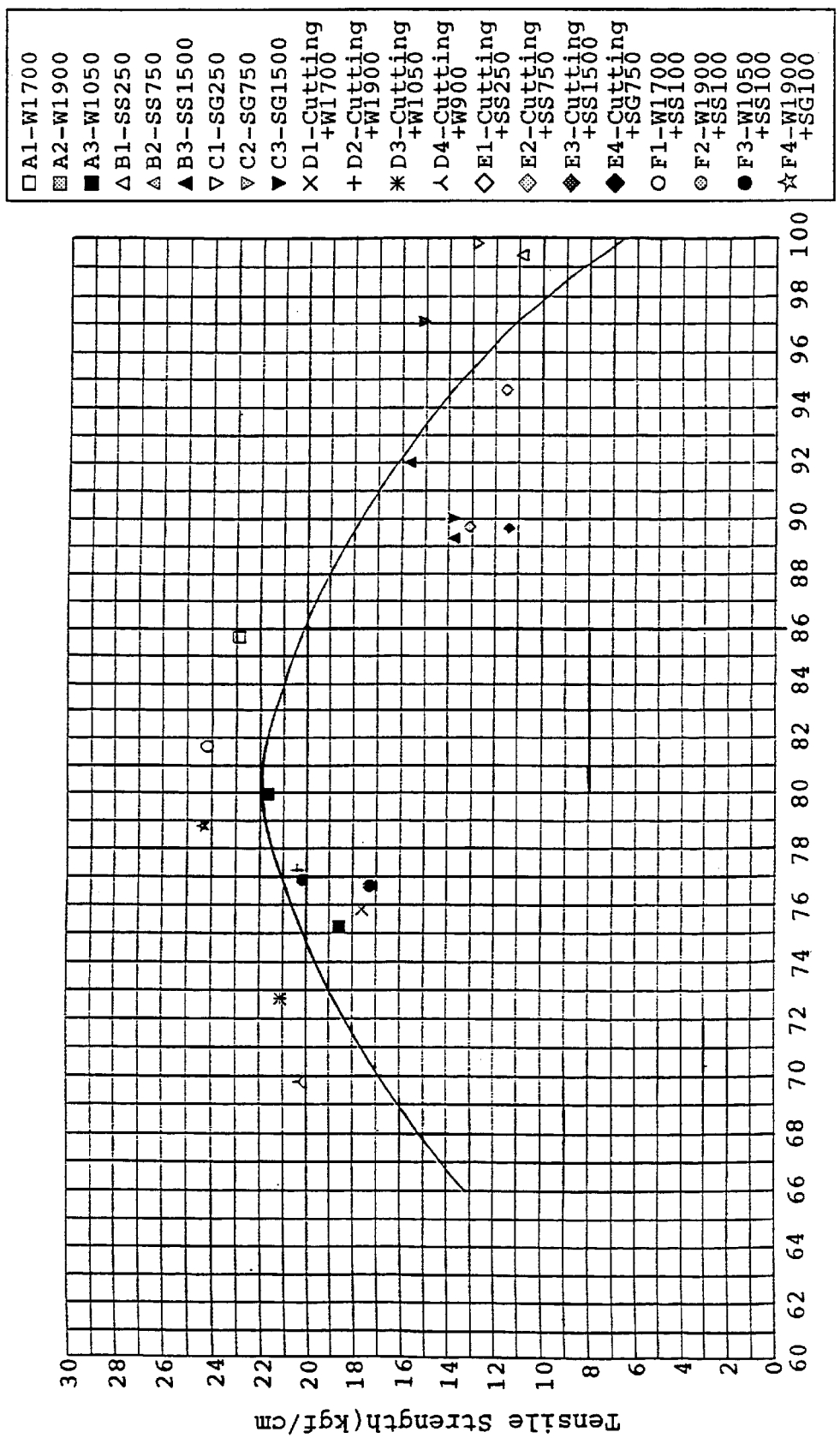
FIG. 20 is a graph showing the relationship between the ratio of unevenness having a height of less than 2 mm at the surfaces of existing concretes treated by the respective methods and tensile strength.
Figure 21:
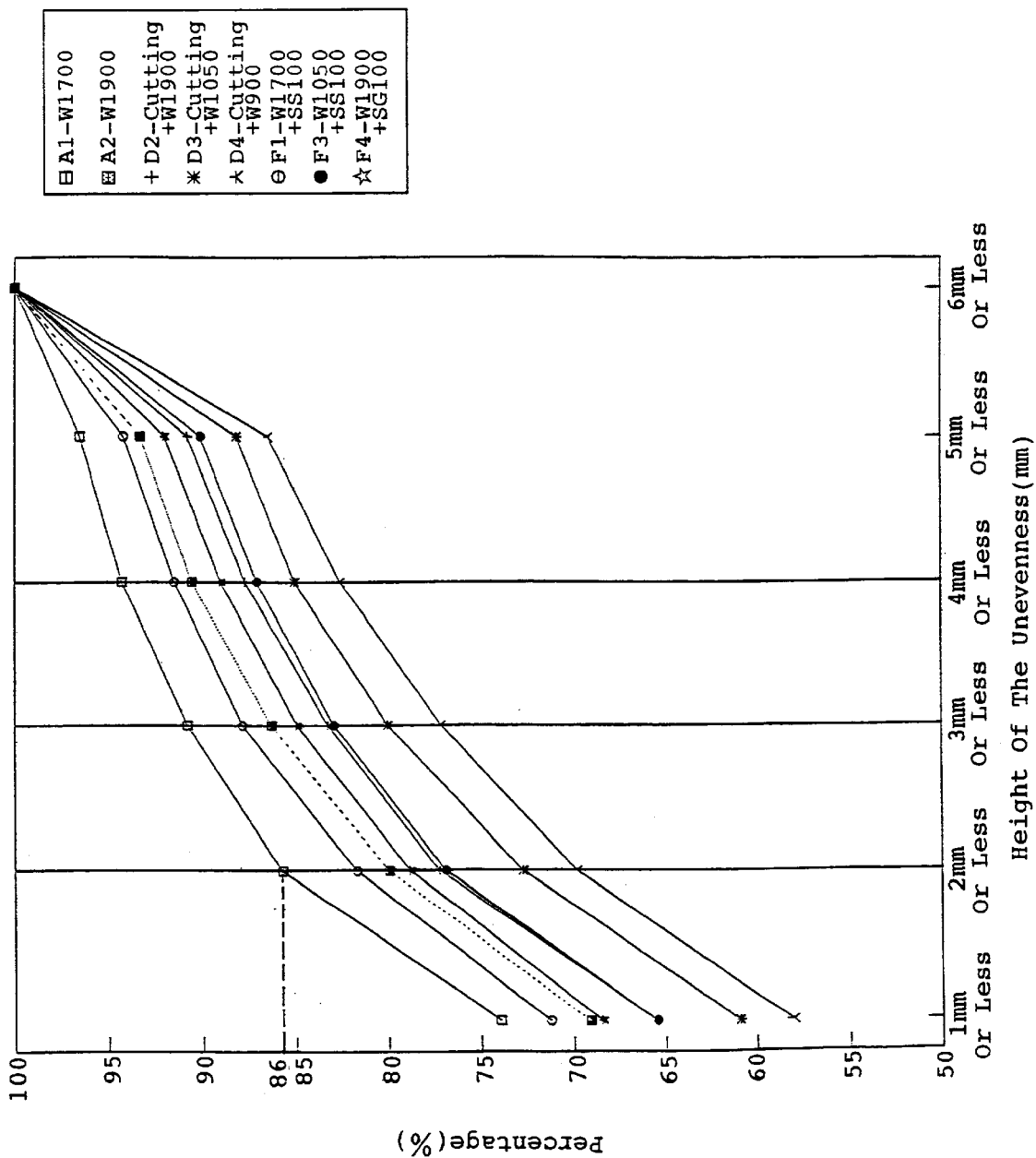
FIG. 21 is a graph showing accumulated frequency distributions, based on the respective methods, of the heights of unevenness in the case that a tensile strength of 20 kgf/cm$^2$ or more can be obtained in a tensile strength test.

FIG. 20 is a graph showing the relationship between the ratio of unevenness having a height of less than 2 mm at the surface of the existing concrete treated by the respective methods and tensile strength. FIG. 21 is a graph showing accumulated frequency distributions, based on the respective methods, of the heights of unevenness in the case that a tensile strength of 20 kgf/cm$^2$ or more can be obtained in a tensile strength test. It can be understood from these measured results that, in order to obtain a sufficient adhesion strength of 20 kgf/cm$^2$ or more, 14% or more among all the unevenness of the whole of the treated-surface is unevenness having a height of 2 mm or more (corresponding to the sixth and seventh aspects).

Thus, in the present invention, existing concretes having surface-treated forms which are little by little different on trial are overlaid with a new concrete (sample) and then the adhesion strengths of the respective resultants are measured to specify an ideal surface-treated form. As the characteristic quantities of the surface-treated form, the average of the unevenness quantities, the standard deviation thereof and the average slope length and the slope length ratio are calculated, and then the calculated results are beforehand stored as ideal values in the data ROM of the evaluating device. The ideal values stored in the data ROM are compared with measured values on the construction spot to evaluate the surface-treated form of the existing concrete surface on the contraction spot.

Therefore, sufficient adhesion strength of the new concrete to the existing concrete can be obtained by treating the existing concrete surface in the manner that the ideal values stored in the data ROM become equal to or similar to the measured values on the construction spot, and then overlaying the existing concrete surface with the new concrete.

As described above, the present invention exhibits the following excellent advantages.

In the surface-treated form evaluating system according to the first aspect, the characteristic quantities of the surface-treated form of the existing concrete are calculated from the unevenness quantities measured by the measuring means. A result of the surface-treated form of the existing concrete can be automatically obtained for a short time on the basis of the characteristic quantities and the characteristic quantities beforehand stored in the storing means. This evaluated result is displayed on the display means such as a CRT or and LCD, or printed by printing means. Thus, the surface-treated form of the existing concrete can be accurately evaluated for a short time.

According to the surface-treated form evaluating system of the second aspect, in the system according to the first aspect, as the characteristic quantities there is used at least one of the average of the unevenness quantities and the standard deviation thereof. In this way, accurate evaluation can be made on the basis of the objective measured data.

According to the surface-treated form evaluating system of the third aspect, in the system according to first or second aspect, such data that the average of the particle sizes and the characteristic quantities correspond to each other are stored in the storing means, and the calculated characteristic quantities are compared with the above-mentioned stored characteristic quantities, correspondingly to the average of the particle sizes, to evaluate the surface-treated form. In this way, more accurate evaluation can be made.

According to the fourth aspect of the invention, in the system according to any of the first to third aspects, the ideal surface-treated form is a surface-treated form in which an average height of the unevenness is from 13 to 35% of the maximum particle size of the aggregates contained in the existing concrete. Evaluation using this makes it possible to obtain a more objective result.

According to the fifth aspect of the invention, in the surface-treated form evaluating system according to any of the first to fourth aspects, the ideal surface-treated form is a surface-treated form in which a slope length ratio of the surface of the existing concrete is 1.13 or more. Evaluation using this makes it possible to obtain a more objective result.

According to the sixth aspect of the invention, in the system according to any of the first to fifth aspects, the ideal surface-treated form is a surface-treated form in which 14% or more among all the unevenness of the surface of the existing concrete is unevenness having a height of 2 mm or more. Evaluation using this makes it possible to obtain a more objective result.

According to the seventh aspect of the invention, the following ideal surface-treated form is adopted. That is, the average height (depth) of unevenness of the surface of the existing concrete is from 13 to 35% of the maximum particle size of aggregates contained in the existing concrete, and the slope length ratio thereof is 1.13 or more, and the unevenness having a height of 2 mm or more occupies 14% or more of all the unevenness. Adoption of such a surface-treated form makes it possible to gain certainly sufficient adhesion strength of the new concrete to the existing concrete surface.

What is claimed is:

1. A system for evaluating a surface-treated form of an existing concrete in an adhesion overlay method of forming macro-unevenness in a surface layer of the existing concrete with highly-pressured water, blasting hard balls onto the surface having the macro-unevenness by a shot blast treatment to form micro-unevenness, and forming a surface layer which is composed of a pavement material of a new concrete and has a given thickness on the uneven surface having the macro- and micro-unevenness, comprising:

measuring means for measuring unevenness quantities of the surface of the existing concrete after the surface-treatments at a given pitch, characteristic quantity calculating means for calculating characteristic quantities of the surface-treated form of the existing concrete from collected results of the unevenness quantities measured by the measuring means, storing means for storing characteristic quantities of a concrete having an ideal surface-treated form which makes it possible to obtain sufficient adhesion strength of the new concrete to the surface of the existing concrete, and evaluating means for comparing the characteristic quantities calculated by the characteristic quantity calculating means with those stored in the storing means and then outputting a result obtained by the comparison.

2. A surface-treated form evaluating system according to claim 1, wherein the characteristic quantities include at least one of the average of the unevenness quantities and the standard deviation thereof.

3. A surface-treated form evaluating system according to claim 2, which further comprises average inputting means for inputting the average of particle sizes of aggregates contained in the existing concrete, such data that the average of the particle sizes and the characteristic quantities correspond to each other being stored in the storing means, and the evaluating means comparing the characteristic quantities calculated by the characteristic quantity calculating means with the characteristic quantities stored in the storing means, correspondingly to the average of the particle sizes, to output a result obtained by the comparison.

4. A surface-treated form evaluating system according to claim 3, wherein the ideal surface-treated form is a surface-treated form in which a slope length ratio of the surface of the existing concrete is 1.13 or more.

5. A surface-treated form evaluating system according to claim 3, wherein the ideal surface-treated form is a surface-treated form in which 14% or more among all the unevenness of the surface of the existing concrete is unevenness having a height of 2 mm or more.

6. A surface-treated form evaluating system according to claim 3 wherein the ideal surface-treated form is a surface-treated form in which an average height of the unevenness is from 13 to 35% of the maximum particle size of the aggregates contained in the existing concrete.

7. A surface-treated form evaluating system according to claim 6, wherein the ideal surface-treated form is a surface-treated form in which a slope length ratio of the surface of the existing concrete is 1.13 or more.

8. A surface-treated form evaluating system according to claim 7, wherein the ideal surface-treated form is a surface-treated form in which 14% or more among all the unevenness of the surface of the existing concrete is unevenness having a height of 2 mm or more.

9. A surface-treated form evaluating system according to claim 2 wherein the ideal surface-treated form is a surface-treated form in which an average height of the unevenness is from 13 to 35% of the maximum particle size of the aggregates contained in the existing concrete.

10. A surface-treated form evaluating system according to claim 2, wherein the ideal surface-treated form is a surface-treated form in which a slope length ratio of the surface of the existing concrete is 1.13 or more.

11. A surface-treated form evaluating system according to claim 2, wherein the ideal surface-treated form is a surface-treated form in which 14% or more among all the unevenness of the surface of the existing concrete is unevenness having a height of 2 mm or more.

12. A surface-treated form evaluating system according to claim 1, which further comprises average inputting means for inputting the average of particle sizes of aggregates contained in the existing concrete, such data that the average of the particle sizes and the characteristic quantities correspond to each other being stored in the storing means, and the evaluating means comparing the characteristic quantities calculated by the characteristic quantity calculating means with the characteristic quantities stored in the storing means, correspondingly to the average of the particle sizes, to output a result obtained by the comparison.

13. A surface-treated form evaluating system according to claim 12 wherein the ideal surface-treated form is a surface-treated form in which an average height of the unevenness is from 13 to 35% of the maximum particle size of the aggregates contained in the existing concrete.

14. A surface-treated form evaluating system according to claim 12, wherein the ideal surface-treated form is a surface-treated form in which a slope length ratio of the surface of the existing concrete is 1.13 or more.

15. A surface-treated form evaluating system according to claim 12, wherein the ideal surface-treated form is a surface-treated form in which a slope length ratio of the surface of the existing concrete is 1.13 or more.

16. A surface-treated form evaluating system according to claim 12, wherein the ideal surface-treated form is a surface-treated form in which 14% or more among all the unevenness of the surface of the existing concrete is unevenness having a height of 2 mm or more.

17. A surface-treated form evaluating system according to claim 1, wherein the ideal surface-treated form is a surface-treated form in which an average height of the unevenness is from 13 to 35% of the maximum particle size of the aggregates contained in the existing concrete.

18. A surface-treated form evaluating system according to claim 1, wherein the ideal surface-treated form is a surface-treated form in which a slope length ratio of the surface of the existing concrete is 1.13 or more.

19. A surface-treated form evaluating system according to claim 1, wherein the ideal surface-treated form is a surface-treated form in which 14% or more among all the unevenness of the surface of the existing concrete is unevenness having a height of 2 mm or more.

20. A surface-treated form of an existing concrete in an adhesion type overlay method, in which the existing concrete is subjected to a surface-treatment and then the treated surface is overlaid with a new concrete, wherein the average height of unevenness of the surface of the existing concrete is from 13 to 35% of the maximum particle size of aggregates contained in the existing concrete, and the slope length ratio thereof is 1.13 or more, and the unevenness having a height of 2 mm or more occupies 14% or more of all the unevenness.

* * * * *